US012106165B2

(12) United States Patent
Zhu

(10) Patent No.: US 12,106,165 B2
(45) Date of Patent: Oct. 1, 2024

(54) PRINTING APPARATUS

(71) Applicant: BROTHER KOGYO KABUSHIKI KAISHA, Nagoya (JP)

(72) Inventor: Feng Zhu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/152,693

(22) Filed: Jan. 10, 2023

(65) Prior Publication Data
US 2023/0229880 A1 Jul. 20, 2023

(30) Foreign Application Priority Data
Jan. 14, 2022 (JP) ................................ 2022-004338

(51) Int. Cl.
*G06K 15/02* (2006.01)
(52) U.S. Cl.
CPC ....... *G06K 15/1842* (2013.01); *G06K 15/028* (2013.01)
(58) Field of Classification Search
CPC .......................... G06K 15/1842; G06K 15/028
See application file for complete search history.

(56) References Cited

U.S. PATENT DOCUMENTS

| 5,589,948 | A * | 12/1996 | Itezono | H04N 1/3873 358/448 |
|---|---|---|---|---|
| 5,635,963 | A * | 6/1997 | Kuboki | H04N 1/0473 400/582 |
| 5,973,793 | A * | 10/1999 | Yoshida | H04N 1/233 358/449 |
| 7,212,309 | B1 * | 5/2007 | Sellers | G06F 3/1208 358/1.18 |
| 8,009,317 | B2 * | 8/2011 | Nagata | B41J 11/0065 358/1.9 |
| 8,432,566 | B2 * | 4/2013 | Adachi | G06F 3/1242 358/1.18 |
| 2001/0026373 | A1* | 10/2001 | Kamata | H04N 1/2323 358/1.12 |
| 2002/0164185 | A1* | 11/2002 | Horiuchi | G06K 15/16 400/76 |
| 2003/0053096 | A1* | 3/2003 | Nagata | B41J 11/0065 358/1.9 |
| 2006/0050097 | A1* | 3/2006 | Hoshiyama | B41J 19/145 347/16 |

(Continued)

FOREIGN PATENT DOCUMENTS

JP 2016168794 A * 9/2016

*Primary Examiner* — Ted W Barnes
(74) *Attorney, Agent, or Firm* — KENEALY VAIDYA LLP

(57) ABSTRACT

A printing apparatus includes: a print head; a conveyance device; and a control device configured to perform control of printing a print image, including: obtain image data indicating an input image; generate print data for printing the print image for each line based on the image data, the generating of the print data including: shifting the dots composing the input image in the sub-scanning direction to form the dots composing the print image; and reduce a width of a plain area in the sub-scanning direction of the print medium, the plain area being an area where the print image is not printed over the entire area of the plain area in the main scanning direction on the print medium.

18 Claims, 15 Drawing Sheets

(56) References Cited

U.S. PATENT DOCUMENTS

| | | | |
|---|---|---|---|
| 2006/0285163 A1* | 12/2006 | Han | G06F 40/163 358/1.18 |
| 2009/0190184 A1* | 7/2009 | Jingu | H04N 1/32144 358/444 |
| 2009/0262394 A1* | 10/2009 | Adachi | G06F 3/1208 358/1.15 |
| 2010/0157380 A1* | 6/2010 | Miyagawa | H04N 1/00034 358/448 |
| 2015/0277822 A1* | 10/2015 | Sawada | G06F 3/125 358/1.15 |

* cited by examiner

PRINTING APPARATUS

REFERENCE TO RELATED APPLICATIONS

This application claims priority from Japanese Patent Application No. 2022-004338 filed on Jan. 14, 2022. The entire content of the priority application is incorporated herein by reference.

BACKGROUND ART

A related art proposes a thermal printer that prints on thermal paper using a thermal line head provided with a plurality of heating elements. The thermal printer creates print data by moving dots in a dot line with a high print rate to another dot line. Since the printing rate per dot line can be reduced, the thermal printer can print at a high speed.

DESCRIPTION

In some cases, in a related-art thermal printer, a portion of a print image may protrude into a margin when moving dots to other dot lines. In this case, there is a possibility that a portion of the print image that protrudes into the margin will not be printed.

Illustrative aspects of the present disclosure provide a printing apparatus configured to print an entire print image while maintaining a high printing speed.

One illustrative aspect of the present disclosure provides a printing apparatus including: a print head having a plurality of elements arranged in a main scanning direction; a conveyance device configured to relatively move a print medium and the print head in a sub-scanning direction, the sub-scanning direction intersecting the main scanning direction; and a control device configured to perform control of printing a print image by controlling the print head to drive the plurality of elements to form dots on each line on the print medium while controlling the conveyance device to relatively move the print medium and the print head in the sub-scanning direction, the control device being configured to: obtain image data indicating an input image; generate print data for printing the print image for each line based on the image data, the generating of the print data including: shifting the dots composing the input image in the sub-scanning direction to form the dots composing the print image; and reduce a width of a plain area in the sub-scanning direction of the print medium, the plain area being an area where the print image is not printed over the entire area of the plain area in the main scanning direction on the print medium.

In the printing apparatus according to the one illustrative aspect, since the elements to be driven among the plurality of elements are distributed by shifting the dots from the input image in the sub-scanning direction, the printing can be performed at a relatively high printing speed. On the other hand, the print image is more elongated in the sub-scanning direction than the input image. By reducing a width of a plain area in the sub-scanning direction in a reduction process, the printing apparatus can print the entire print image elongated in the sub-scanning direction. Therefore, the printing apparatus can print the entire print image while maintaining the high printing speed.

Another illustrative aspect of the present disclosure provides a printing apparatus including: a print head having a plurality of elements arranged in a main scanning direction; a conveyance device configured to relatively move a print medium and the print head in a sub-scanning direction, the sub-scanning direction intersecting the main scanning direction; and a control device configured to perform control of printing a print image by controlling the print head to drive the plurality of elements to form dots on each line on the print medium while controlling the conveyance device to relatively move the print medium and the print head in the sub-scanning direction, the control device being configured to: obtain image data indicating an input image; decide a shifting amount for shifting the dots composing the input image in the sub-scanning direction; and generate print data for printing the print image for each line based on the image data, the generating of the print data including: shifting the dots composing the input image in the sub-scanning direction by the determined shifting amount to form the dots composing the print image.

In the printing apparatus according to the another illustrative aspect, since the elements to be driven among the plurality of elements are dispersed by shifting the dots from the input image in the sub-scanning direction, the printing can be performed at a relatively high printing speed.

According to still another illustrative aspect of the present disclosure, a printing apparatus includes: a print head having a plurality of elements arranged in a main scanning direction; a conveyance device configured to relatively move a continuous medium and the print head in a sub-scanning direction, the sub-scanning direction being intersecting the main scanning direction, the continuous medium being elongated in the sub-scanning direction; and a control device configured to perform control of creating a printed matter, the creating of the printed matter including forming dots for each line on the continuous medium by controlling the print head to drive the plurality of elements while controlling the conveyance device to relatively move the continuous medium and the print head in the sub-scanning direction, thereby printing a print image, the control device being configured to: obtain image data indicating an input image; generate print data for printing the print image for each line based on the image data, the generating of the print data including: shifting the dots composing the input image in the sub-scanning direction to form the dots composing the print image; select whether to perform the shifting of the dots in the generating of the print data; and decide a width of the printed matter in the sub-scanning direction based on the generated print data, wherein in the deciding, the control device is configured to set a first width to be larger than a second width, the first width corresponding to the width of the print material in the sub-scanning direction in a case the performing of the shifting is selected to be performed, the second width corresponding to the width of the print material in the sub-scanning direction in a case the performing of the shifting process is selected to not to be performed.

In the printing apparatus according to the still another illustrative aspect of the present disclosure, since the elements to be driven among the plurality of elements are dispersed by shifting the dots from the input image in the sub-scanning direction, the printing can be performed at a relatively high printing speed. On the other hand, the print image is more elongated in the sub-scanning direction than the input image. When creating the printed matter, the printing apparatus selects whether or not to perform the shifting process in the generation process. When the execution of the shifting process is selected in the generation process, the printing apparatus sets the width of the printed matter in the sub-scanning direction to be larger than the width of the printed matter in the sub-scanning direction when the shifting process is not executed. Therefore, the printing apparatus can print the entire print image while maintaining the high printing speed.

Figure 1:
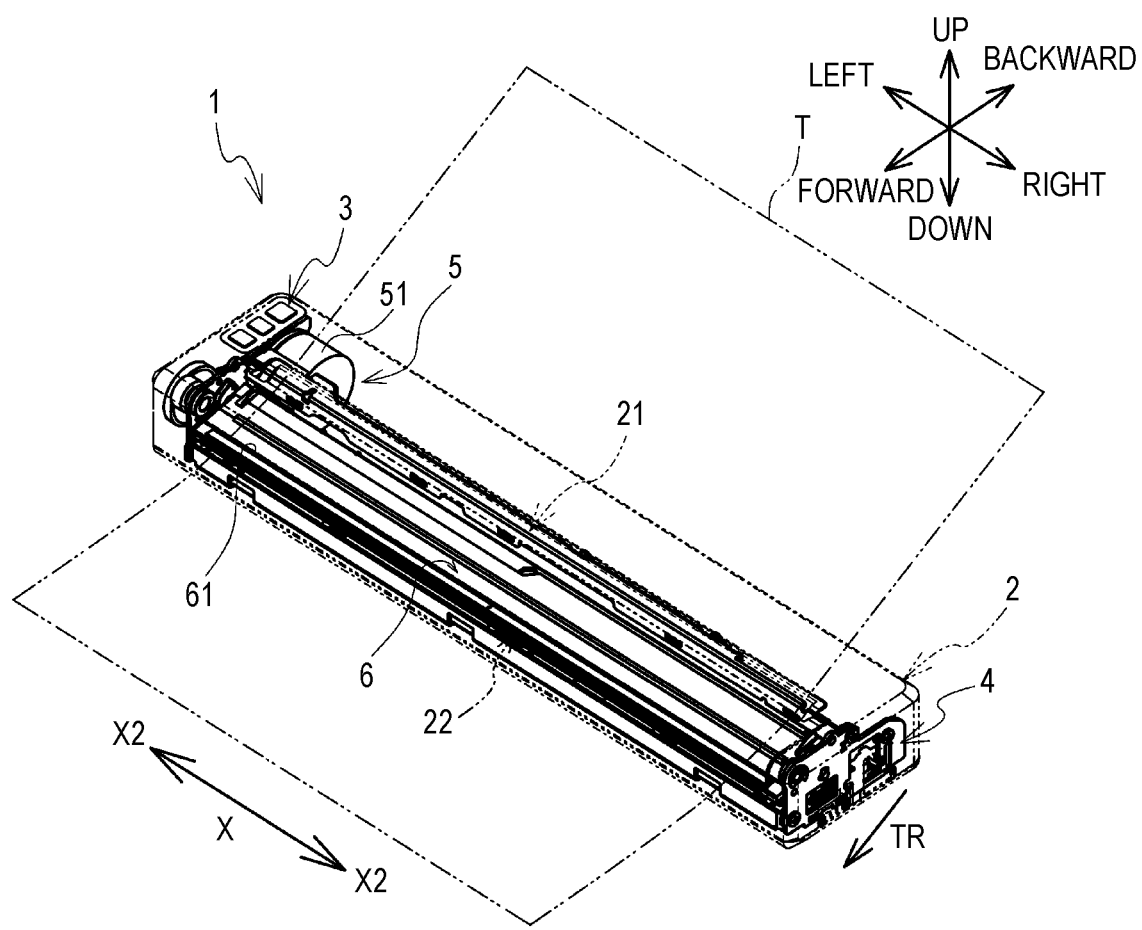
FIG. 1 is an explanatory diagram of a printing apparatus 1.

A printing apparatus 1 according to the embodiment of the present disclosure will be described with reference to the drawings. The drawings are used to explain technical characteristic that can be employed by the present disclosure. That is, configuration and control of the device described in the drawings are merely illustrative examples, not limited thereto.

As illustrated in FIG. 1, the printing apparatus 1 is a thermal printer configured to print characters (objects such as letters, symbols, numbers, and graphics) on a print medium T. The print medium T is not limited to the specific medium, but is, for example, sheet-shaped or tape-shaped, and in this embodiment, the print medium T is cut paper T1 of a thermal recording medium (refer to FIG. 3) or roll paper T2 around which the thermal recording medium is rolled (refer to FIG. 10).

The printing apparatus 1 includes a case 2, an input device 3, a communication device 4, a conveyance device 5, and a print head 6. The case 2 has a rectangular parallelepiped shape, and is longer in a left-right direction than in a front-rear direction and an up-down direction. The case 2 accommodates the conveyance device 5 and the print head 6. The case 2 detachably accommodates a power supply 10 illustrated in FIG. 2. The power supply 10 supplies power to the printing apparatus 1. An insertion port 21 is formed on an upper surface of the case 2, and an ejection port 22 is formed on a front surface of the case 2. Each of the insertion port 21 and the ejection port 22 is formed in a rectangular shape elongated in the left-right direction. The print medium T is inserted into the printing apparatus 1 through the insertion port 21 and ejected from the printing apparatus 1 through the ejection port 22. The input device 3 is provided near a left edge of the upper surface of the case 2. The input device 3 includes a plurality of push buttons. The communication device 4 is a USB jack provided on a right side surface of the case 2. A connector of the USB cable can be connected to the communication device 4.

Figure 2:
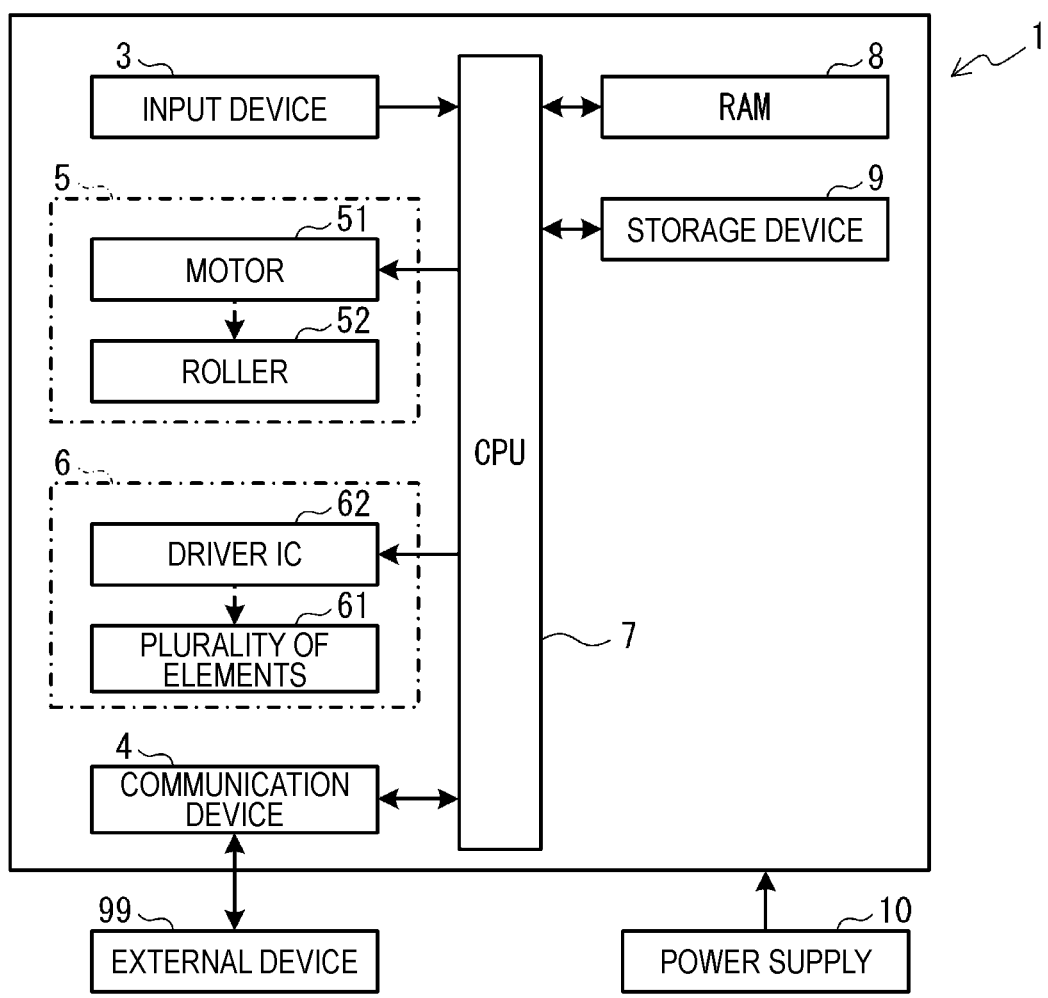
FIG. 2 is a block diagram illustrating an electrical configuration of the printing apparatus 1.

The conveyance device 5 includes a motor 51 and a roller 52 illustrated in FIG. 2. The roller 52 has a roller shape centering on an axis extending in the left-right direction and is provided to be oblique forward in the case 2. The motor 51 rotates the roller 52. The conveyance device 5 moves the print medium T relative to the print head 6 by conveying the print medium T in a conveying direction TR due to the rotation of the rollers 52. The conveying direction TR is a direction perpendicular to the left-right direction, and in the present embodiment, extends backward-obliquely upward and forward-obliquely downward. Hereinafter, in the conveying direction TR, the backward-obliquely upward is referred to as an upstream side, and the forward-obliquely downward is referred to as a downstream side.

The print head 6 is provided below the roller 52. The print head 6 is the line head and includes a plurality of elements 61 and a driver IC 62 illustrated in FIG. 2. Each of the plurality of elements 61 of this embodiment is a heating element that generates heat due to energization. The plurality of elements 61 contact the print medium T pressed downward by the roller 52 and generate heat to perform printing on the print medium T. The driver IC 62 is configured to selectively energize the plurality of elements 61 to generate heat.

The electrical configuration of the printing apparatus 1 will be described with reference to FIG. 2. The printing apparatus 1 includes a CPU 7, a RAM 8, a storage device 9, the communication device 4, the input device 3, the conveyance device 5, and the print head 6. The conveyance device 5 includes the motor 51 and the roller 52. The print head 6 includes the driver IC 62 and the plurality of elements 61. The CPU 7 controls the printing apparatus 1. The CPU 7 is electrically connected to the RAM 8, the storage device 9, the communication device 4, the input device 3, the motor 51, and the driver IC 62. The RAM 8 stores temporary data such as various variables. The storage device 9 stores a program executed by the CPU 7 to control the printing apparatus 1, print data, and various setting information. The communication device 4 is a controller for executing communication with an external device 99 via a USB cable. The external device 99 is, for example, a known information processing device such as a PC, a tablet PC, and a smart phone.

The printing operation by the printing apparatus 1 will be described. The printing apparatus 1 selectively energizes the plurality of elements 61 of the print head 6 according to the print data. The print data includes an instruction to energize and an instruction to stop energization for each of the plurality of elements 61. Thermal energy is applied to portions of the print medium T that are in contact with the plurality of energized elements 61. Accordingly, the printing apparatus 1 forms pixel columns aligned in a main scanning direction X corresponding to an arrangement of the plurality of elements 61. The printing apparatus 1 intermittently energizes the plurality of elements 61 multiple times while rotating the rollers 52 by the motor 51 to convey the print medium T downstream in the conveying direction TR. As a result, a plurality of lines are formed on the print medium T in a direction perpendicular to a direction in which the pixels are arranged in the image for one line. The plurality of lines form the print image by applying shading on the print medium T depending on whether or not each pixel is formed. The above operation is referred to as "printing operation".

In the following description, a direction in which the plurality of elements 61 are arranged is referred to as a "main scanning direction X", and a unit of printing corresponding to one pixel column arranged in the main scanning direction X is referred to as "line". A direction in which a plurality of the lines are arranged is referred to as a "sub-scanning direction Y". The sub-scanning direction Y is defined by the conveying direction TR. A unit of printing corresponding to each of the plurality of elements 61 is referred to as a "dot".

A printed matter created by the printing apparatus 1 will be described with reference to FIGS. 3 to 11. In a first specific example illustrated in FIG. 3, the printing is performed on A4 size cut paper T1 which is a thermal recording medium based on input images U1 and U2. The cut paper T1 has a rectangular shape extending in the main scanning direction X and the sub-scanning direction Y. A length of the cut paper T1 in the sub-scanning direction Y is A1, and a length of the cut paper T1 in the main scanning direction X is B.

The left-right direction of the input images U1, U2, U3, and U4 (refer to FIG. 8) corresponds to the main scanning direction X, and the up-down direction of the input images U1, U2, U3, and U4 corresponds to the sub-scanning direction Y. The left direction of the input images U1, U2, U3, and U4 corresponds to one side X1 in the main scanning direction, and the right direction of the input images U1, U2, U3, and U4 corresponds to the other side X2 in the main scanning direction. The up direction of the input images U1, U2, U3, and U4 corresponds to a downstream side Y1 in the sub-scanning direction, and the down direction of the input images U1, U2, U3, and U4 corresponds to an upstream side Y2 in the sub-scanning direction.

The input images U1 and U2 are printed inside a printable area N1 of the cut paper T1. The printable area is set as the area on the print medium T in which the printing is enabled. The printable area N1 has a rectangular shape extending in the main scanning direction X and the sub-scanning direction Y. For the ease of understanding, the printable area is schematically indicated by solid lines in FIGS. 3 to 11.

A length of the printable area N1 in the sub-scanning direction Y is C1, and a length of the printable area N1 in the main scanning direction X is D. Positions of the vertices of the printable area N1 on the one side X1 in the main scanning direction and the downstream side Y1 in the sub-scanning direction are G11, positions of the vertices of the printable area N1 on the other side X2 in the main scanning direction and the downstream side Y1 in the sub-scanning direction are H11, positions of the vertices of the printable area N1 on the one side X1 in the main scanning direction and the upstream side Y2 in the sub-scanning direction are J11, and positions of the vertices of the printable area N1 on the other side X2 in the main scanning direction and the upstream side Y2 in the sub-scanning direction are K11.

Figure 3:
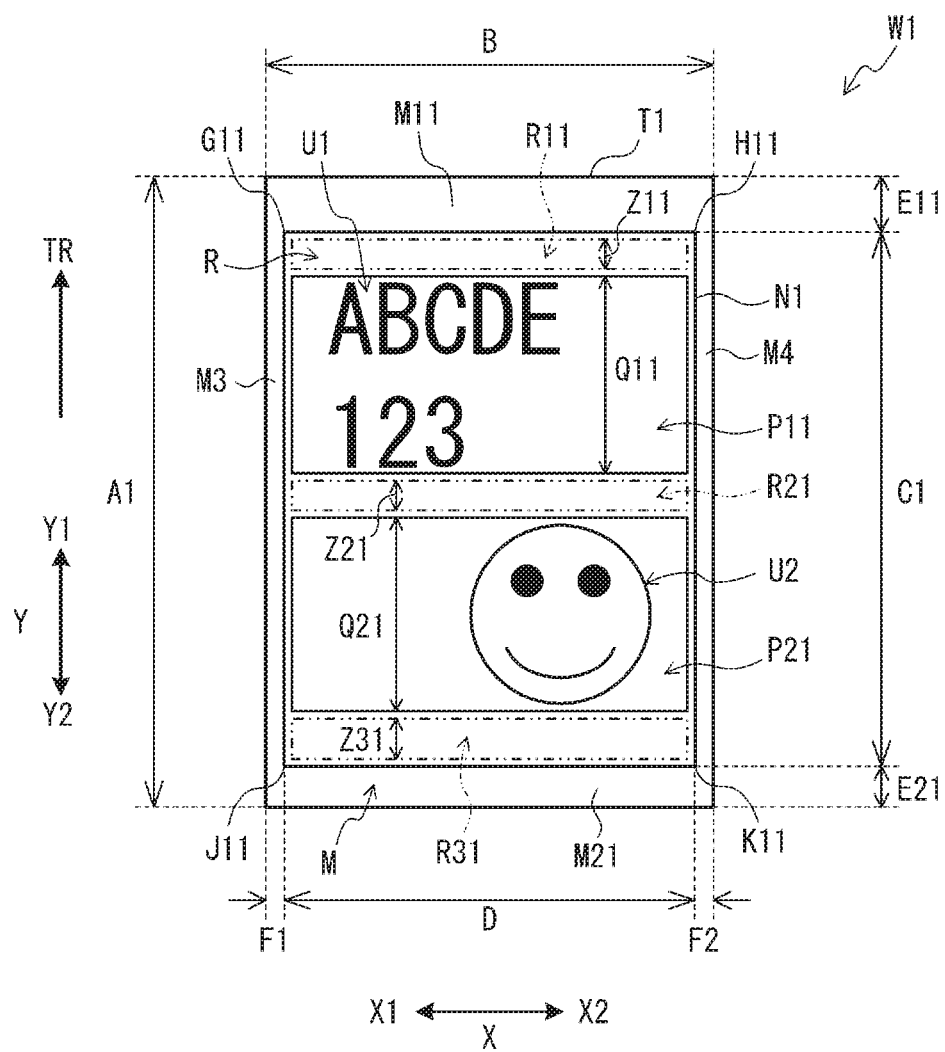
FIG. 3 is an explanatory diagram of a case where input images U1 and U2 of a first specific example are printed on cut paper T1.

The input images U1 and U2 are arranged in the sub-scanning direction Y inside the printable area N1. The input image U1 is arranged on the downstream side Y1 in the sub-scanning direction with respect to the input image U2. A rectangular area that includes the input image and has a rectangular shape extending in the main scanning direction X and the sub-scanning direction Y is referred to as an image area. A length of the image area in the sub-scanning direction Y is equal to a length of the input image in the sub-scanning direction Y. A length of the image area in the main scanning direction X is equal to a length of the printable area N1 in the main scanning direction X. That is, the image area is an area where the lines composing the input image are formed to be arranged in the sub-scanning direction Y. At least one dot is formed in the line in the image area. For the ease of understanding, the image areas are schematically indicated by solid lines in FIGS. 3 to 11. An image area P11 illustrated in FIG. 3 is an image area including the input image U1. An image area P21 is an image area including the input image U2.

A blank area R is formed between the edge of the printable area N1 on the downstream side Y1 in the sub-scanning direction and the input image U1, between the input images U1 and U2, and between the input image U2 and the edge of the printable area N1 on the upstream side Y2 in the sub-scanning direction. For the ease of understanding, the blank area R is schematically indicated by two-dot dashed lines in FIGS. 3 to 11. The blank area R is an area where no image is formed over the entire area in the main scanning direction X in the printable area N1. A unit of printing corresponding to one pixel column arranged in the main scanning direction X in the blank area R is referred to as a "blank line". In other words, no dot is formed over the entire area in the main scanning direction X in the blank line.

A blank area R11 is formed between the edge of the printable area N1 on the downstream side Y1 in the sub-scanning direction and the input image U1. A blank area R21 is formed between the input images U1 and U2. A blank area R31 is formed between the input image U2 and the edge of the printable area N1 on the upstream side Y2 in the sub-scanning direction.

A length of the blank area R11 in the sub-scanning direction Y is Z11. A length of the blank area R21 in the sub-scanning direction Y is Z21. A length of the blank area R31 in the sub-scanning direction Y is Z31. Each of the lengths of the blank areas R11, R21, and R31 in the main scanning direction X is equal to the length of the printable area N1 in the main scanning direction X. In the sub-scanning direction Y, a sum of the lengths Z11, Z21, and Z21 of the blank areas R11, R21, and R31, and lengths Q11 and Q21 of the image areas P11 and P21 is equal to the length C1 of the printable area N1.

A margin M is formed outside the printable area N1. A margin M11 is formed between the edge of the printable area N1 on the downstream Y1 in the sub-scanning direction and the edge of the cut paper T1 on the downstream Y1 in the sub-scanning direction. A margin M21 is formed between the edge of the printable area N1 on the upstream side Y2 in the sub-scanning direction and the edge of the cut paper T1 on the upstream side Y2 in the sub-scanning direction. A margin M3 is formed between the edge of the printable area N1 on the one side X1 in the main scanning direction and the edge of the cut paper T1 on the one side X1 in the main scanning direction. A margin M4 is formed between the edge of the printable area N1 on the other side X2 in the main scanning direction and the edge of the cut paper T1 on the other side X2 in the main scanning direction.

A length of the margin M11 in the sub-scanning direction Y is E11. A length of the margin M21 in the sub-scanning direction Y is E21. In the sub-scanning direction Y, a sum of the length C1 of the printable area N1 and the lengths E11 and E21 of the margins M11 and M21 is equal to the length A1 of the cut paper T1. A length of the margin M3 in the main scanning direction X is F1. A length of the blank M4 in the main scanning direction X is F2. In the main scanning direction X, a sum of the length D of the printable area N1 and the lengths F1 and F2 of the margins M3 and M4 is equal to the length B of the cut paper T1. The lengths E11, E21, F1, and F2 of the margins M11, M21, M3, and M4 are set by the user operating the input device 3.

In some cases, the printing apparatus 1 may create printed matters W1 and W2 (refer to FIG. 10) by printing the input images U1 and U2 as print images as they are on the cut paper T1 or the roll paper T2 (refer to FIG. 10) described later. On the other hand, in some cases, the printing apparatus 1 may create the printed matters W1 and W2 by printing the print images in which the dots composing the input images U1 and U2 are shifted in the sub-scanning direction Y. The printing apparatus 1 shifts the dots composing the input image in the sub-scanning direction Y to disperse the dots into the plurality of lines. Accordingly, the printing apparatus 1 can decrease a peak number of the plurality of elements 61 to be energized and can perform the printing at the higher printing speed than the case where the dots are not shifted.

In this embodiment, the dots composing the input image are shifted to the upstream side Y2 in the sub-scanning direction. Hereinafter, shifting the dots composing the input image in the sub-scanning direction Y by the printing apparatus 1 is referred to as "performing a shifting process". The dots composing the print image printed by the printing apparatus 1 are formed by shifting the dots composing the input image in the sub-scanning direction Y by the shifting process.

Figure 4A:
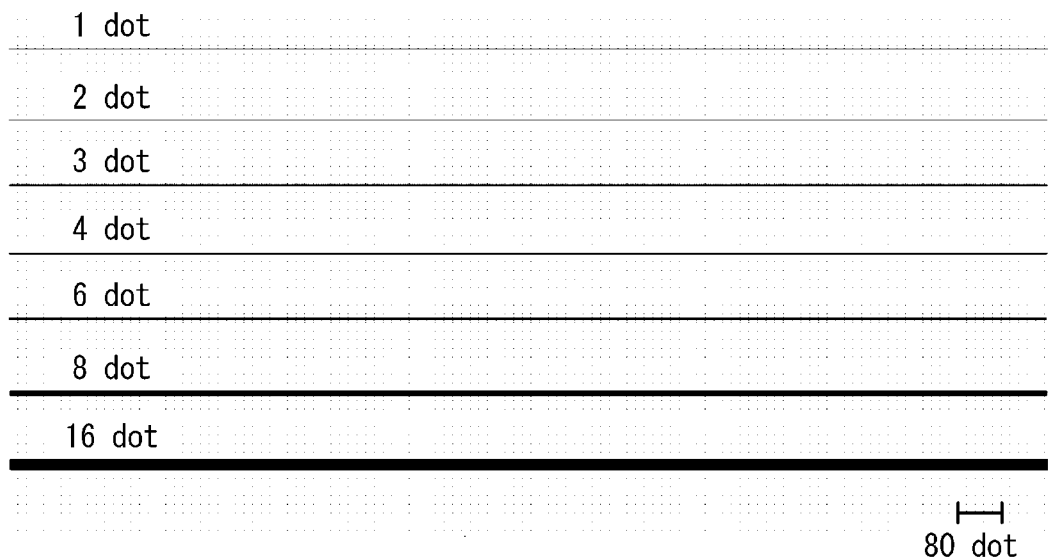
FIGS. 4A and 4B are explanatory diagrams of a case where dots composing the print image are shifted in a sub-scanning direction Y.
Figure 4B:
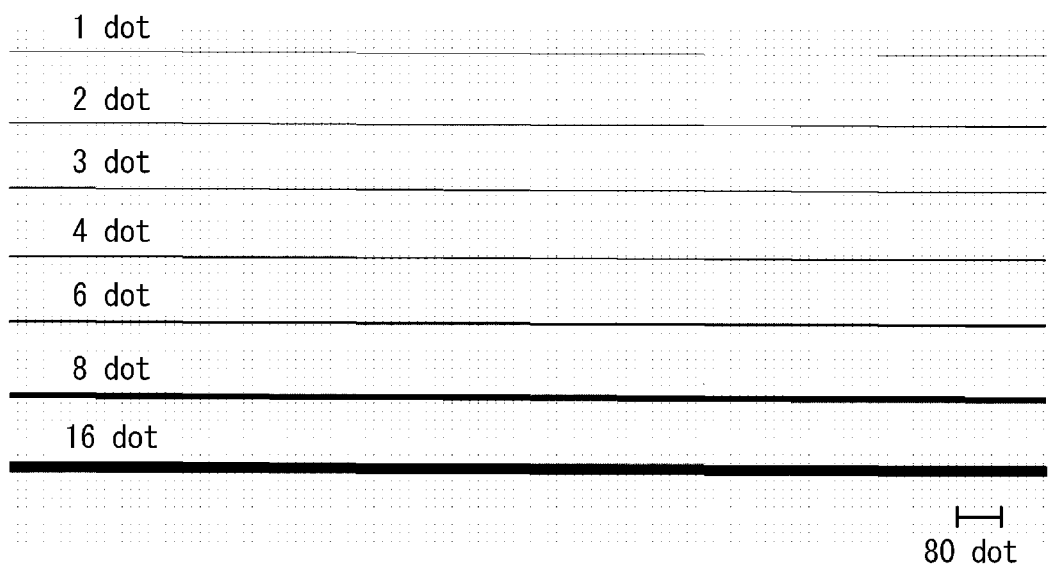
Figure 4B:
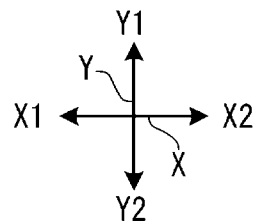

In an example illustrated in FIGS. 4A and 4B, the shifting process is performed on ruled lines extending in the main scanning direction X and having thicknesses of 1 dot, 2 dots, 3 dots, 4 dots, 6 dots, 8 dots, and 16 dots as the input image. FIG. 4A illustrates the input image before the shifting process is performed. FIG. 4B illustrates the print image formed by performing the shifting process on the input image.

In the printing apparatus 1, the dots are shifted to the upstream side Y2 in the sub-scanning direction by the shifting process. The amount by which the dots are shifted to the upstream side Y2 in the sub-scanning direction increases toward the other side X2 in the main scanning direction of the input image. As the dots are shifted by the shifting process, the print image is allowed to be oblique to the other side X2 in the main scanning direction and to the upstream side Y2 in the sub-scanning direction in comparison with the input image. In the printable area N1, the dots at the edge of the other side X2 in the main scanning direction are shifted most to the upstream side Y2 in the sub-scanning direction. In the printable area N1, a maximum value of the amount by which dots are shifted in the sub-scanning direction Y due to the shifting process is referred to as a "shifting amount L". The shifting amount L is decided, for example, within a range of 0 μm to 150 μm. An oblique angle θ of the input image due to the shifting process is $\theta = \arctan(L/D)$. The shifting amount L is a sufficiently small value with respect to a length D of the printable area N1 in the main scanning direction X. Therefore, it is difficult for a user to visually check that the print image is oblique.

Figure 5:
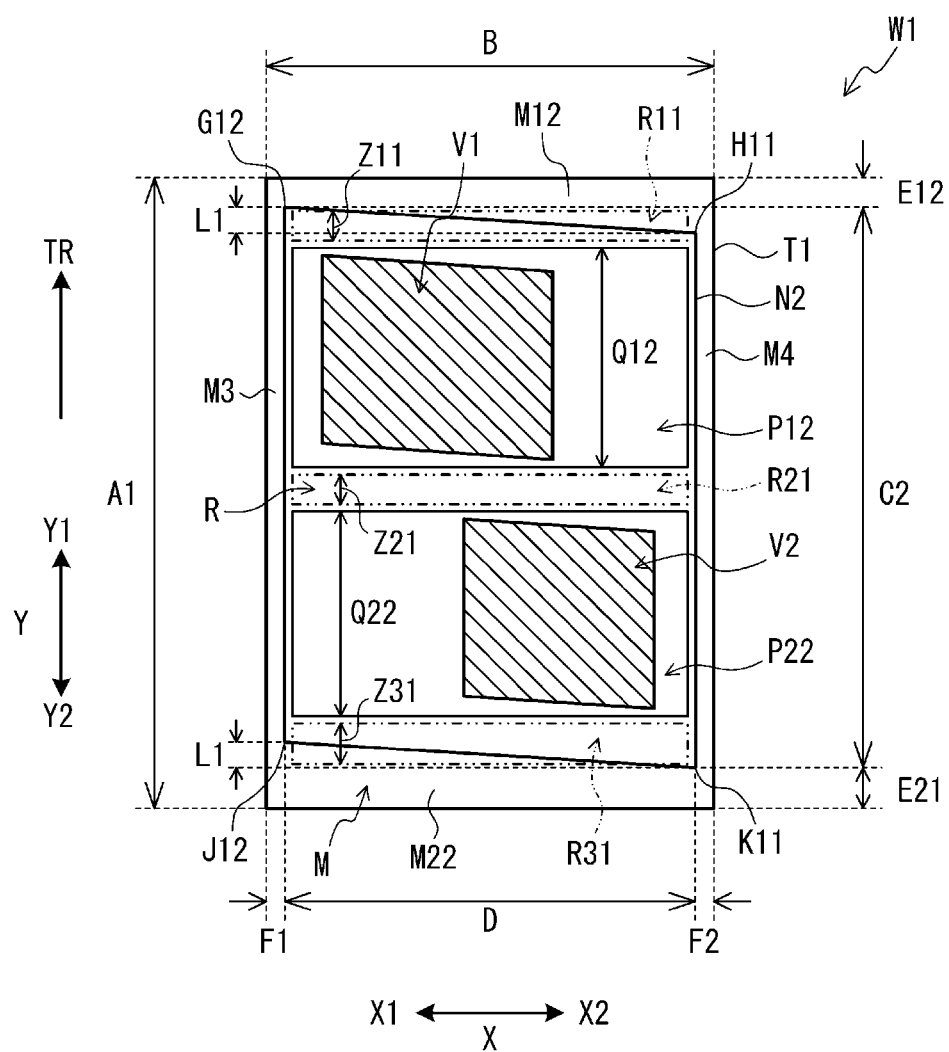
FIG. 5 is an explanatory diagram of a case where print images V1 and V2 of the first specific example are printed on the cut paper T1.

In FIG. 5, print images V1 and V2 are printed on the cut paper T1. The print images V1 and V2 are images after the shifting process is performed on the input images U1 and U2 (refer to FIG. 3). For the ease of understanding, in FIGS. 5, 7, 9, and 11, the image after the shifting process is performed on the input image is schematically indicated by hatched parallelograms. FIGS. 3 to 11 schematically illustrate a size of the image, a size of the printable area, a size of the image area, a size of the blank area R, and a shifting amount.

By performing the shifting process on the input images U1 and U2, the print images V1 and V2 are more elongated in the sub-scanning direction Y based on the shifting amount L1 than the input images U1 and U2. A length of an image area P12 of the print image V1 in the sub-scanning direction Y is Q12 (>Q11), and a length of an image area P22 of the print image V2 in the sub-scanning direction Y is Q22 (>Q12). In the sub-scanning direction Y, since the lengths Q12 and Q22 of the image areas P12 and P22 are larger than the lengths Q11 and Q21 of the image areas P11 and P21, a sum (Q12+Q22+Z11+Z21+Z31) of the lengths of the image areas and the blank area R is larger than the length C1 (refer to FIG. 3) of the printable area N1. As the result, there is a possibility that a portion of the print image will protrude into the margin M and will not be printed.

When printing the print images V1 and V2 on which the shifting process is performed, the printing apparatus 1 reduces the size of the area where the print images V1 and V2 are not printed on the cut paper T1 in the sub-scanning direction Y. The printing apparatus 1 reduces the length of the margin M in the sub-scanning direction Y as the first example of the area where the print images V1 and V2 are not printed. The printable area is enlarged in the sub-scanning direction Y by the amount that the margin M is reduced in the sub-scanning direction Y.

In the first specific example illustrated in FIG. 5, the printing apparatus 1 reduces the margin M, which is on the downstream side Y1 in the sub-scanning direction with respect to a printable area N2, in the sub-scanning direction Y to form a margin M12. It is noted that the printing apparatus 1 does not reduce a margin M22 on the upstream side Y2 in the sub-scanning direction with respect to the printable area N2.

The printable area N2 enlarged in the sub-scanning direction Y becomes a parallelogram in accordance with the print images V1 and V2. The positions of the vertices of the printable area N2 on the one side X1 in the main scanning direction and the downstream side Y1 in the sub-scanning direction are G12, and positions of the vertices of the printable area N1 on the one side X1 in the main scanning direction and the upstream side Y2 in the sub-scanning direction are J12. The positions G12 and J12 are shifted to the downstream side Y1 in the sub-scanning direction by the shifting amount L1 with respect to the positions G11 and J11. It is noted that positions of the vertices of the printable area N1 on the other side X2 in the main scanning direction and the downstream side Y1 in the sub-scanning direction remain as H11, and positions of the vertices of the printable area N1 on the other side X2 in the main scanning direction and the upstream side Y2 in the sub-scanning direction remain as K11.

The length of the margin M12 in the sub-scanning direction Y is reduced to E12. The length of the margin M22 in the sub-scanning direction Y remains unchanged as E21. The length E12 satisfies the condition of E12=E11−L1 based on the length E11 (refer to FIG. 3) of the margin M11 in the sub-scanning direction Y and the shifting amount L1.

In the sub-scanning direction Y, as the margin M is reduced by the shifting amount L1, a length C2 of the printable area N2 is larger than the length C1 of the printable area N1 (C2=C1+L1). Accordingly, the printing apparatus 1 can print the entire print images V1 and V2 even when the shifting process is executed.

In the method of reducing the margin M in the sub-scanning direction Y, in the first specific example illustrated in FIG. 5, the printing apparatus 1 reduces the margin M on the downstream side Y1 in the sub-scanning direction with respect to the printable area N2. On the other hand, the printing apparatus 1 may reduce the margin M on the upstream side Y2 in the sub-scanning direction with respect to the printable area N2. The printing apparatus 1 may also reduce the margins M on both downstream side Y1 in the sub-scanning direction and upstream side Y2 in the sub-scanning direction with respect to the printable area N2. In the case of reducing the margins M on both the downstream side Y1 in the sub-scanning direction and the upstream side Y2 in the sub-scanning direction with respect to the printable area N2, the printing apparatus 1 may reduce the respective margins M by the same length. In this case, the difference between the position of the print image on the print medium T actually printed and the position of the print image assumed by the user is reduced.

Figure 6:
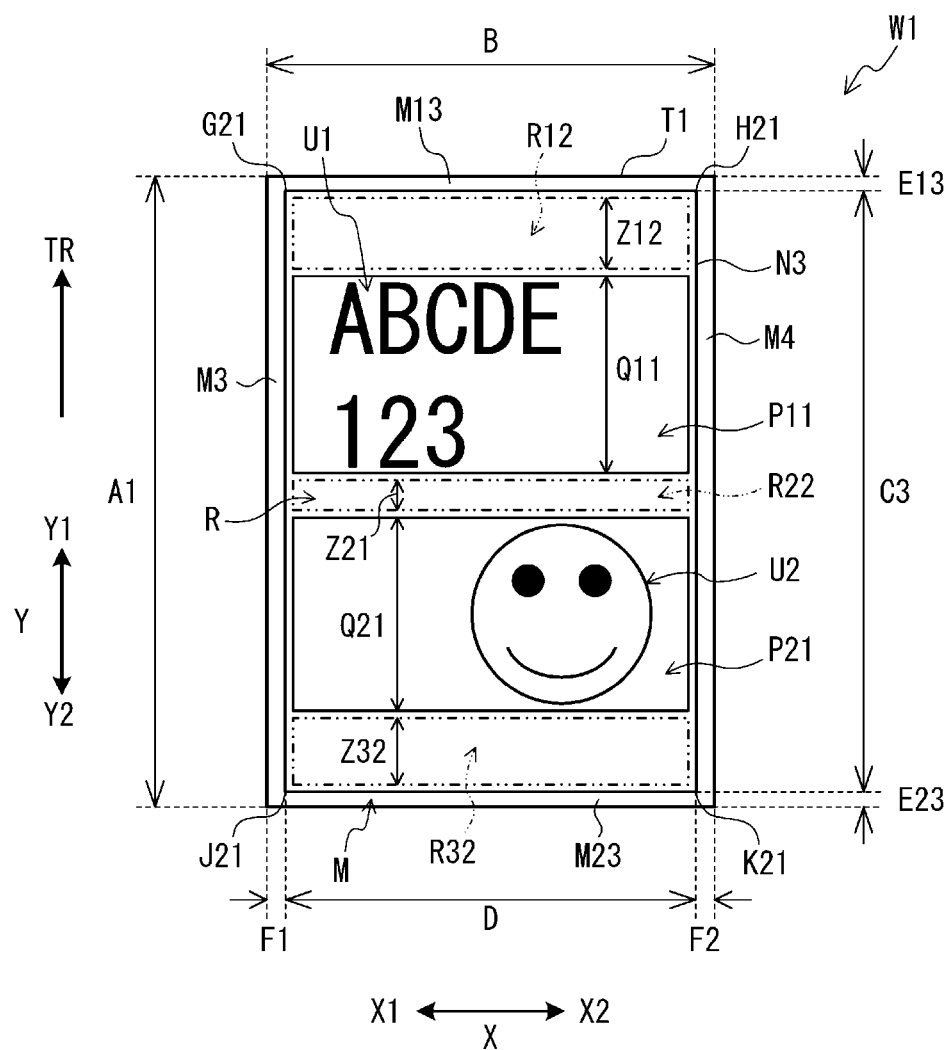
FIG. 6 is an explanatory diagram of a case where the input images U1 and U2 of a second specific example are printed on the cut paper T1.

The second specific example illustrated in FIG. 6 is different from the first specific example in that margins M13 and M23 are set instead of the margins M11 and M21. Lengths E13 and E23 of the margins M13 and M23 in the sub-scanning direction Y are smaller than the lengths E11 and E21 of the margins M11 and M21 in the sub-scanning direction Y (refer to FIG. 3). The sum of the lengths E13 and E23 is smaller than the shifting amount L1 (E13+E23<L1).

Blank areas R12, R22, and R32 are set instead of the blank areas R11, R21, and R31. The lengths of the blank areas R12 and R32 in the sub-scanning direction Y are Z12 and Z32. The lengths Z12 and Z32 are larger than the lengths Z11 and Z31 (refer to FIG. 3) of the blank areas R11 and R31 in the sub-scanning direction Y. It is noted that the length of the blank area R22 in the sub-scanning direction Y is equal to the length Z21 of the blank area R22 in the sub-scanning direction Y. A sum of lengths E13, E23, Z12, and Z32 is equal to a sum of E11, E21, Z11, and Z31 (E13+E23+Z12+Z32=E11+E21+Z11+Z31).

A printable area N3 is set instead of the printable area N1. The length of the printable area N3 in the sub-scanning direction Y is C3. The positions of the vertices of the printable area N3 on the one side X1 in the main scanning direction and the downstream side Y1 in the sub-scanning direction are G21, the positions of the vertices of the printable area N3 on the other side X2 in the main scanning direction and the downstream side Y1 in the sub-scanning direction are H21, the positions of the vertices of the printable area N3 on one side X1 in the main scanning direction and the upstream side Y2 in the sub-scanning direction are J21, and the positions of the vertices of the printable area N3 on the other side X2 in the main scanning direction and the upstream side Y2 in the sub-scanning direction are K21.

Figure 7:
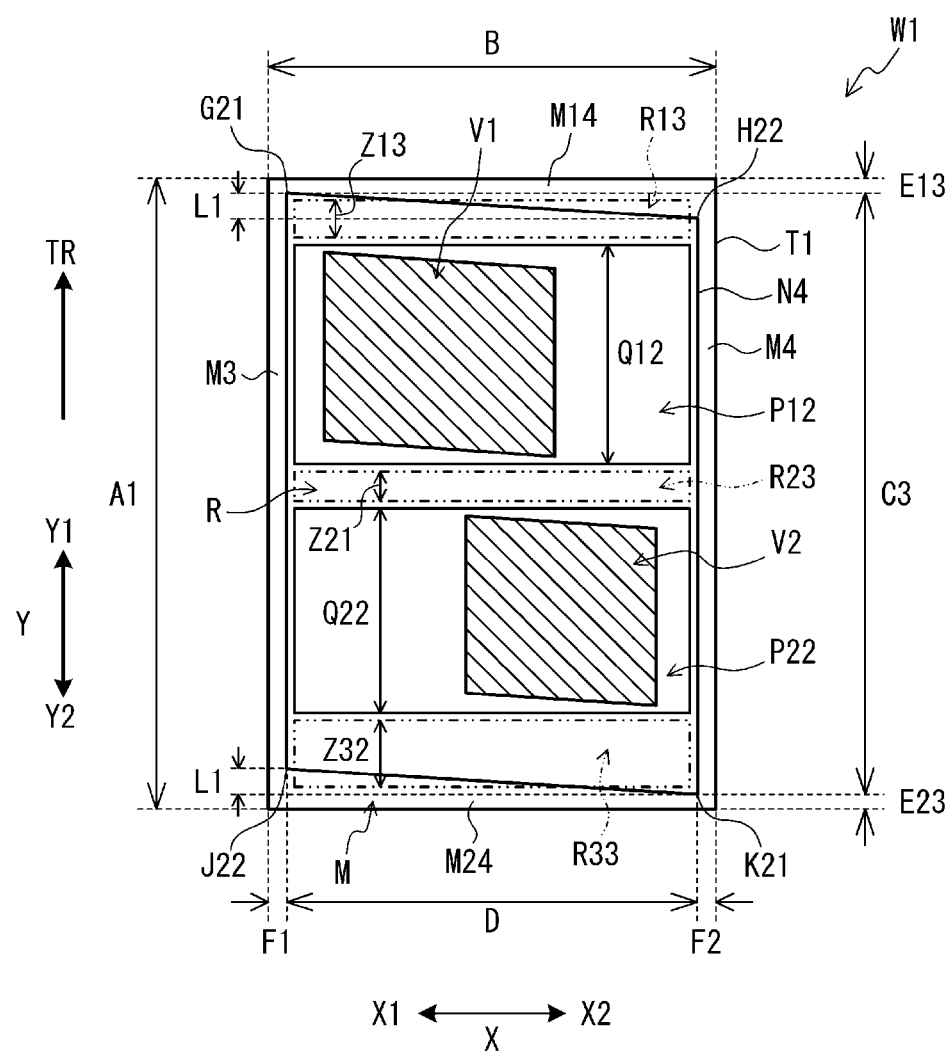
FIG. 7 is an explanatory diagram of a case where the print images V1 and V2 of the second specific example are printed on the cut paper T1.

In FIG. 7, the print images V1 and V2 are printed on the cut paper T1 set in the second specific example. The print images V1 and V2 are more elongated in the sub-scanning direction Y based on the shifting amount L1 than the input images U1 and U2. In the cut paper T1 set in the second specific example, since a sum of the lengths E13 and E23 is smaller than the shifting amount L1, the margins M13 and M23 (refer to FIG. 6) cannot be reduced by the shifting amount L1.

The printing apparatus 1 reduces the length of the blank area R in the sub-scanning direction Y as the second example of the area where the print images V1 and V2 are not printed. Accordingly, the printing apparatus 1 prints the entire print images V1 and V2 formed by performing the shifting process inside the printable area.

In the second specific example illustrated in FIG. 7, the printing apparatus 1 reduces the blank area R on the downstream side Y1 in the sub-scanning direction with respect to the print image V1 in the sub-scanning direction Y to form a blank area R13. It is noted that the printing apparatus 1 does not reduce a blank area R33 on the upstream side Y2 in the sub-scanning direction with respect to the print image V2. The printing apparatus 1 does not reduce a blank area R23 between the print images V1 and V2.

A printable area N4 after the shifting process is a parallelogram. The positions of the vertices of the printable area N4 on the other side X2 in the main scanning direction and the downstream side Y1 in the sub-scanning direction are H22, and the positions of the vertices of the printable area N4 on the one side X1 in the main scanning direction and the upstream side Y2 in the sub-scanning direction are J22. The position H22 is shifted to the upstream side Y2 in the sub-scanning direction by the shifting amount L1 with respect to the position H21. The position J22 is shifted to the downstream side Y1 in the sub-scanning direction by the shifting amount L1 with respect to the position J21. It is noted that the positions of the vertices of the printable area N4 on the one side X1 in the main scanning direction and the downstream side Y1 in the sub-scanning direction remain as H21, and the positions of the vertices of the printable area N4 on the other side X2 in the main scanning direction and the upstream side Y2 in the sub-scanning direction remain as K21.

The length of the blank area R13 in the sub-scanning direction Y is reduced to Z13. The lengths of the blank areas R23 and R33 in the sub-scanning direction Y remain unchanged as Z21 and Z32. The length Z13 satisfies the condition Z13=Z12−L1 based on the length Z12 (refer to FIG. 6) of the blank area R12 in the sub-scanning direction Y and the shifting amount L1. When reducing the blank area R12 to the blank area R13, the printing apparatus 1 deletes the amount of blank lines corresponding to the shifting amount L1 from the blank area R12.

The printing apparatus 1 reduces the blank area R in the sub-scanning direction Y by the shifting amount L1 in the cut paper T1 set in the second specific example. Accordingly, the printing apparatus 1 can print the entire print images V1 and V2 even when the length of the printable area N4 remain as C3. The printing apparatus 1 prints the print images V1 and V2 by any one or a combination of both of the method of reducing the margin M in the sub-scanning direction Y as in the first specific example and the method of reducing the blank area R in the sub-scanning direction Y as in the second specific example.

In the method of reducing the blank area R in the sub-scanning direction Y, in the second specific example illustrated in FIG. 7, the printing apparatus 1 reduces the blank area R on the downstream side Y1 in the sub-scanning direction with respect to the print image V1. On the other hand, the printing apparatus 1 can also reduce the blank area R on the upstream side Y2 in the sub-scanning direction with respect to the print image V2. The printing apparatus 1 can also reduce the blank area R between the print images V1 and V2. The printing apparatus 1 can also combine to reduce at least two of the blank area R on the downstream side Y1 in the sub-scanning direction with respect to the print image V1, the blank area R on the upstream side Y2 in the sub-scanning direction with respect to the print image V2, and the blank area R between the print images V1 and V2. When combining to reduce at least two of the blank areas R described above, the printing apparatus 1 can also set the amounts of deleting the blank lines in each of the blank areas R to be the same. In this case, since each blank area R is reduced by the same length, the difference between the position of the print image on the print medium T actually printed and the position of the print image assumed by the user becomes smaller.

Figure 8:
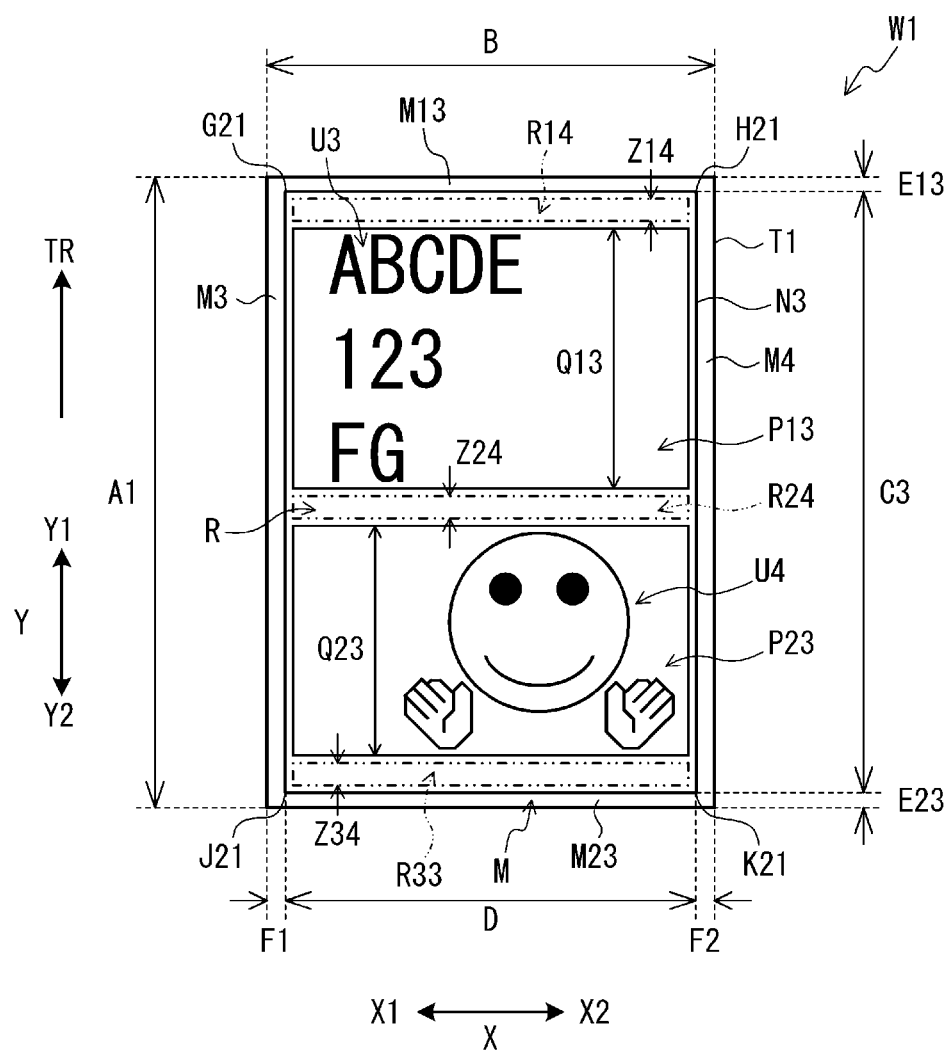
FIG. 8 is an explanatory diagram of a case where input images U3 and U4 of a third specific example are printed on the cut paper T1.

The third specific example illustrated in FIG. 8 is different from the second specific example in that the printing is performed based on input images U3 and U4 instead of input images U1 and U2. The lengths of the input images U3 and U4 in the sub-scanning direction Y are larger than the lengths of the input images U1 and U2 in the sub-scanning direction Y. That is, a length Q13 of an image area P13 in the sub-scanning direction Y including the input image U3 is larger than the length Q11 of the image area P11 in the sub-scanning direction Y (refer to FIG. 6). A length Q23 of an image area P23 in the sub-scanning direction Y including the input image U4 is larger than the length Q21 of the image area P21 in the sub-scanning direction Y (refer to FIG. 6).

Blank areas R14, R24, and R34 are set instead of the blank areas R12, R22, and R32. Lengths Z14, Z24, and Z34 of the blank areas R14, R24, and R34 in the sub-scanning direction Y are smaller than the lengths Z12, Z21, and Z32 (refer to FIG. 6) of the blank areas R12, R22, and R32, respectively. In the sub-scanning direction Y, a sum of the lengths E13 and E23 of the margins M and the lengths Z14, Z24, and Z34 of the blank areas R is smaller than the shifting amount L1 (E13+E23+Z12+Z22+Z32<L1).

Figure 9:
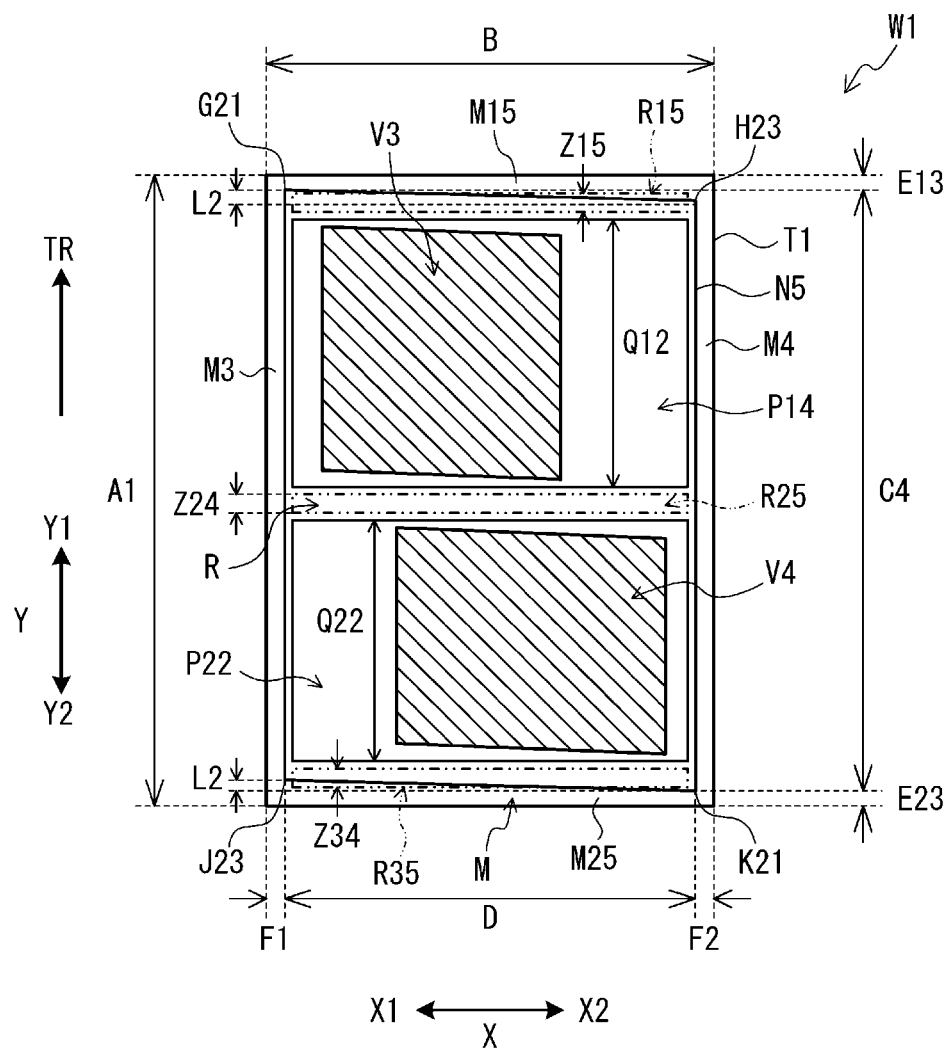
FIG. 9 is an explanatory diagram of a case where print images V3 and V4 of the third specific example are printed on the cut paper T1.

In FIG. 9, as the third specific example, the print image is printed on the cut paper T1 set as in the second specific example. When the shifting process is performed on the input images U3 and U4, since the lengths E13 and E23 (refer to FIG. 8) of the margins M and the lengths Z14, Z24, and Z34 (refer to FIG. 8) of the blank areas R are not sufficiently larger than the shifting amount L1, the margin M and the blank area R cannot be reduced in the sub-scanning direction Y by the shifting amount L1. Therefore, the entire print image shifted in the sub-scanning direction Y by the shifting amount L1 cannot be printed on the cut paper T1 set as in the second specific example.

When a sum of the lengths E13 and E23 of the margins M and the lengths Z14, Z24, and Z34 of the blank areas R in the sub-scanning direction Y is smaller than the shifting amount L1, the printing apparatus 1 decreases a shifting amount to L2 (<L1). The printing apparatus 1 decides the shifting amount L2 within a range that satisfies the condition of E13+E23+Z14+Z24+Z34≥L2.

In the third specific example illustrated in FIG. 9, the printing apparatus 1 reduces the blank area R on the downstream side Y1 in the sub-scanning direction with respect to the print image V1 in the sub-scanning direction Y to form a blank area R15. It is noted that the printing apparatus 1 does not reduce a blank area R35 on the upstream side Y2 in the sub-scanning direction with respect to the print image V2. The printing apparatus 1 does not reduce a blank area R25 between the print images V1 and V2. The printing apparatus 1 does not reduce a margin M15 on the downstream side Y1 in the sub-scanning direction with respect to a printable area N5 where the shifting process is performed. The printing apparatus 1 does not reduce a margin M25 on the upstream side Y2 in the sub-scanning direction with respect to the printable area N5.

The printing apparatus 1 prints print images V3 and V4 on the cut paper T1 set as in the second specific example. The printable area N5 is a parallelogram that is closer to a rectangle than the printable area N4 (refer to FIG. 7). The length of the printable area N5 in the sub-scanning direction Y is C4.

The positions of the vertices of the printable area N5 on the other side X2 in the main scanning direction and the downstream side Y1 in the sub-scanning direction are H23, and the positions of the vertices of the printable area N5 on the one side X1 in the main scanning direction and the upstream side Y2 in the sub-scanning direction are J23. The position H23 is shifted to the upstream side Y2 in the sub-scanning direction by the shifting amount L2 with respect to the position H21. The position J23 is shifted to the downstream side Y1 in the sub-scanning direction by the shifting amount L2 with respect to the position J21. It is noted that the positions of the vertices of the printable area N5 on the one side X1 in the main scanning direction and the downstream side Y1 in the sub-scanning direction remain as H21, and the positions of the vertices of the printable area N5 on the other side X2 in the main scanning direction and the upstream side Y2 in the sub-scanning direction remain as K21.

The length of the blank area R15 in the sub-scanning direction Y is reduced to Z15. The lengths of the blank areas R25 and R35 in the sub-scanning direction Y remain unchanged as Z24 and Z34. The lengths of the margins M15 and M25 in the sub-scanning direction Y remain unchanged as E13 and E23. The length Z15 satisfies the condition of Z15=Z14−L2 based on the length Z14 (refer to FIG. 8) of the blank area R14 in the sub-scanning direction Y and the shifting amount L2. When reducing the blank area R14 to the blank area R15, the printing apparatus 1 deletes the amount of the blank lines corresponding to the shifting amount L1 from the blank area R12.

The printing apparatus 1 executes the shifting process while decreasing the shifting amount to L2 and prints the print images V3 and V4 on the cut paper T1 set as in the second specific example. Accordingly, the printing apparatus 1 can print the entire print images V3 and V4 even when the length of the printable area N4 remains as C3.

When the printing apparatus 1 executes the shifting process by decreasing the shifting amount to L2 as in the third specific example, the blank area R on the downstream side Y1 in the sub-scanning direction is reduced with respect to the print image V1 in FIG. 9. On the other hand, the printing apparatus 1 can also reduce the blank area R different from the blank area R on the downstream side Y1 in the sub-scanning direction with respect to the print image V1. The printing apparatus 1 can also reduce the margin M. The printing apparatus 1 can also reduce both the margin M and the blank area R.

Figure 10:
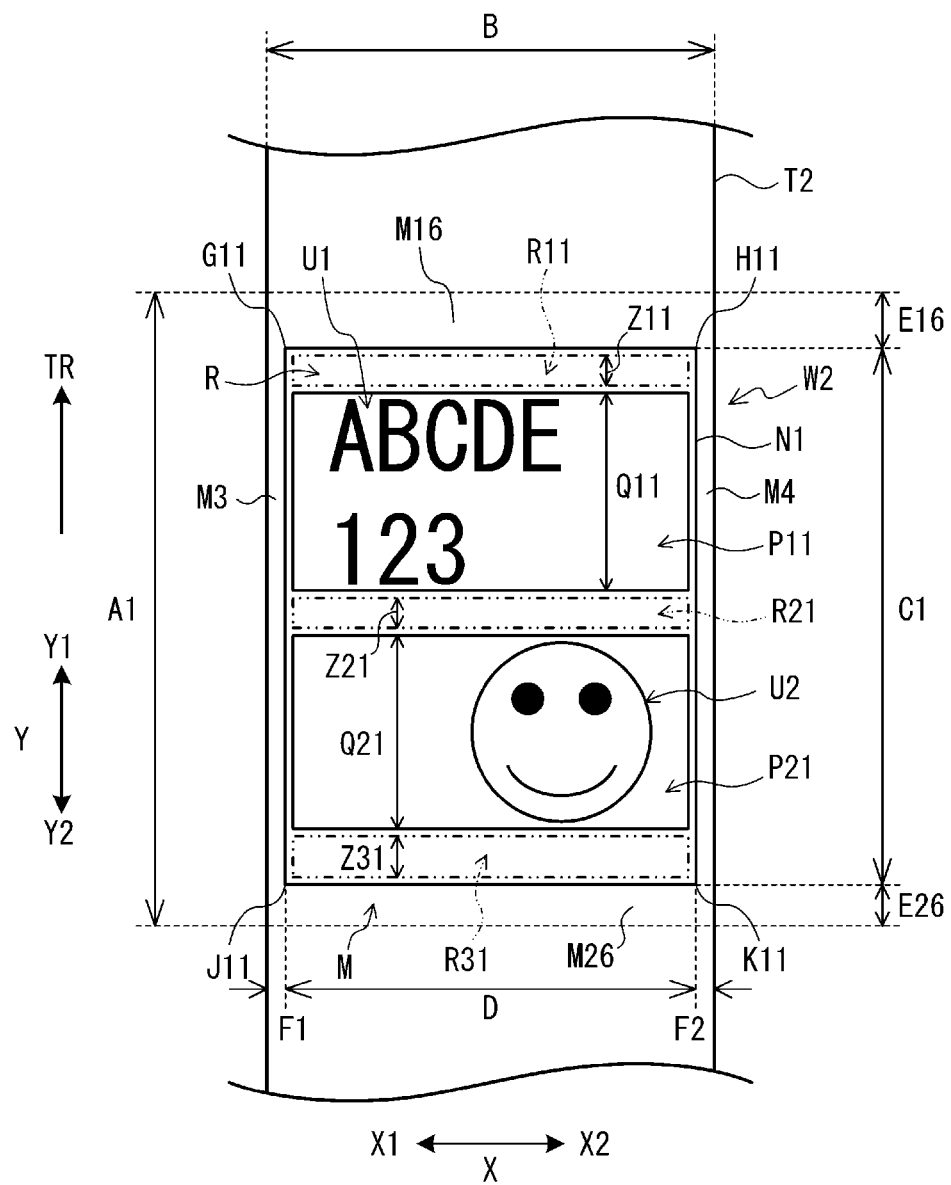
FIG. 10 is an explanatory diagram of a case where the input images U1 and U2 of a fourth specific example are printed on roll paper T2.

The fourth specific example illustrated in FIG. 10 is different from the first specific example in that the printing is performed on the roll paper T2 instead of the cut paper T1 to create the printed matter W2. The printed matter W2 includes the printable area N1 and the margin M.

Margins M16 and M26 in the sub-scanning direction Y on the roll paper T2 are defined by lengths E16 and E26 set by the user via the input device 3. The margin M16 is defined in the range from the edge of the printable area N1 on the downstream side Y1 in the sub-scanning direction to the position separated by the length E16 on the downstream side Y1 in the sub-scanning direction. The margin M26 is defined in the range from the edge of the printable area N1 on the upstream side Y2 in the sub-scanning direction to the position separated by the length E26 on the upstream side Y2 in the sub-scanning direction.

Figure 11:
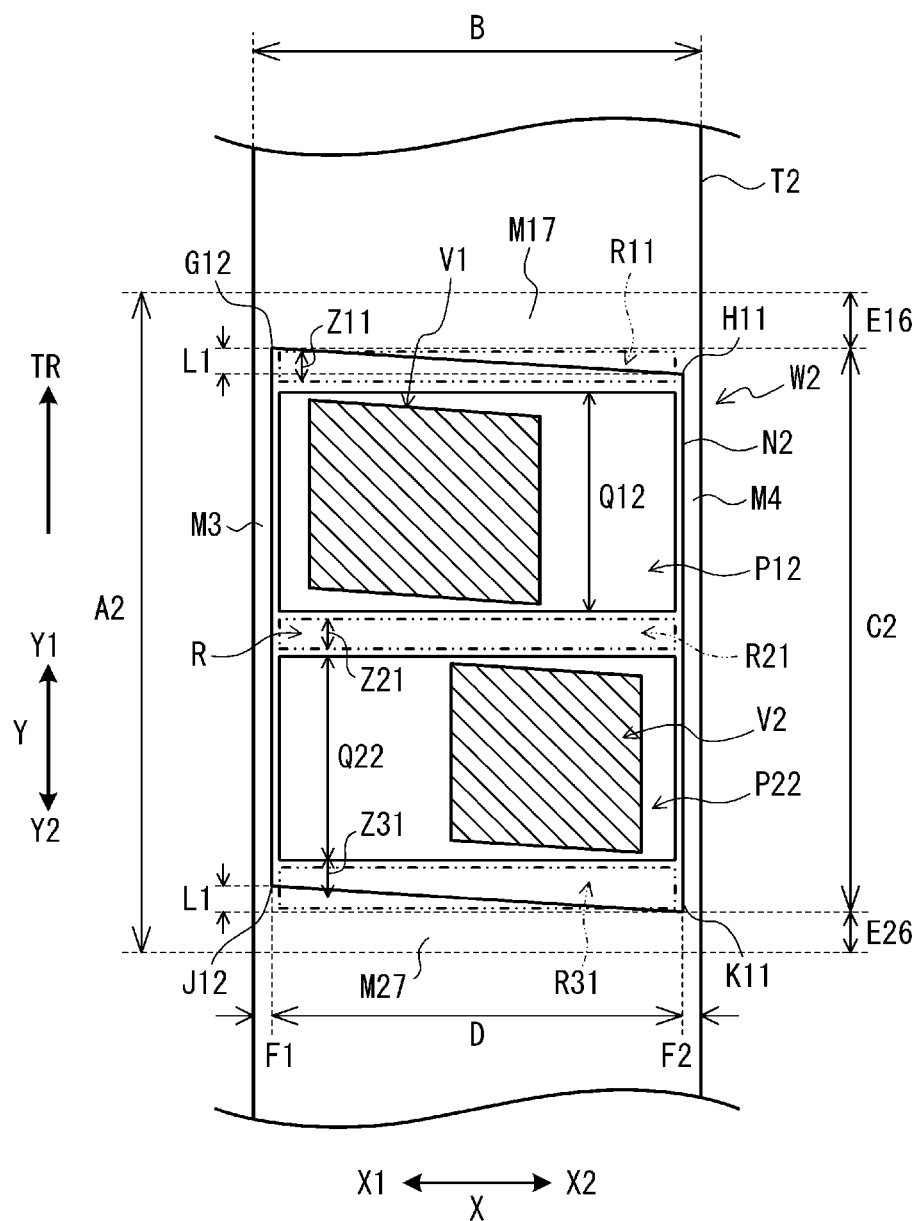
FIG. 11 is an explanatory diagram of a case where the print images V1 and V2 of the fourth specific example are printed on the roll paper T2.

In FIG. 11, as the fourth specific example, the print images V1 and V2 are printed on the roll paper T2. In the fourth specific example, the printing apparatus 1 does not reduce the margin M and the blank area R. The printing apparatus 1 performs the shifting process to form the printable area N2 from the printable area N1. The length C2 of the printable area N2 in the sub-scanning direction Y is larger by the shifting amount L1 than the length C1 of the printable area N1 in the sub-scanning direction Y. The printing apparatus 1 does not change lengths of margins M17 and M27 in the sub-scanning direction Y after the shifting process from E16 and E26.

The printing apparatus 1 elongates the printed matter W2 in the sub-scanning direction Y by the enlarged amount of the shifting amount L1 in the sub-scanning direction Y. A length A2 of the printed matter W2 in the sub-scanning direction Y when the shifting process is performed is larger by the shifting amount L1 than the length A1 (refer to FIG. 10) of the printed matter W2 in the sub-scanning direction Y when the shifting process is not executed (A2=A1+L1). The printing apparatus 1 elongates the printed matter W2 in the sub-scanning direction Y to print the entire print images V1 and V2.

When printing the print image of which the shifting process is executed on the roll paper T2 as in the fourth specific example, the printing apparatus 1 does not enlarge the length A1 of the printed matter W2 in the sub-scanning direction Y to the length A2 and can also reduce the margin M or blank area R.

A main process executed by the CPU 7 of the printing apparatus 1 will be described with reference to FIGS. 12 to 15. The user selects the input image which is planned to be printed and inputs a start instruction via the input device 3. When detecting the start instruction, the CPU 7 reads out a program for executing the main process from the storage device 9 to the RAM 8. The CPU 7 executes the main process having the following steps in accordance with the instructions contained in the read program. Various data formed in the course of the main process are stored in the storage device 9 as appropriate.

The RAM 8 stores a shift flag and a margin reduction flag as flags used for the main process. The shift flag stores 1 when the shifting process is executed in the main process and stores 0 when the shifting process is not executed in the main process. The margin reduction flag stores 1 when the margin M is reduced and stores 0 when the margin M is not reduced. At the start of the main process, the values of the shift flag and the margin reduction flag are 0.

Figure 12:
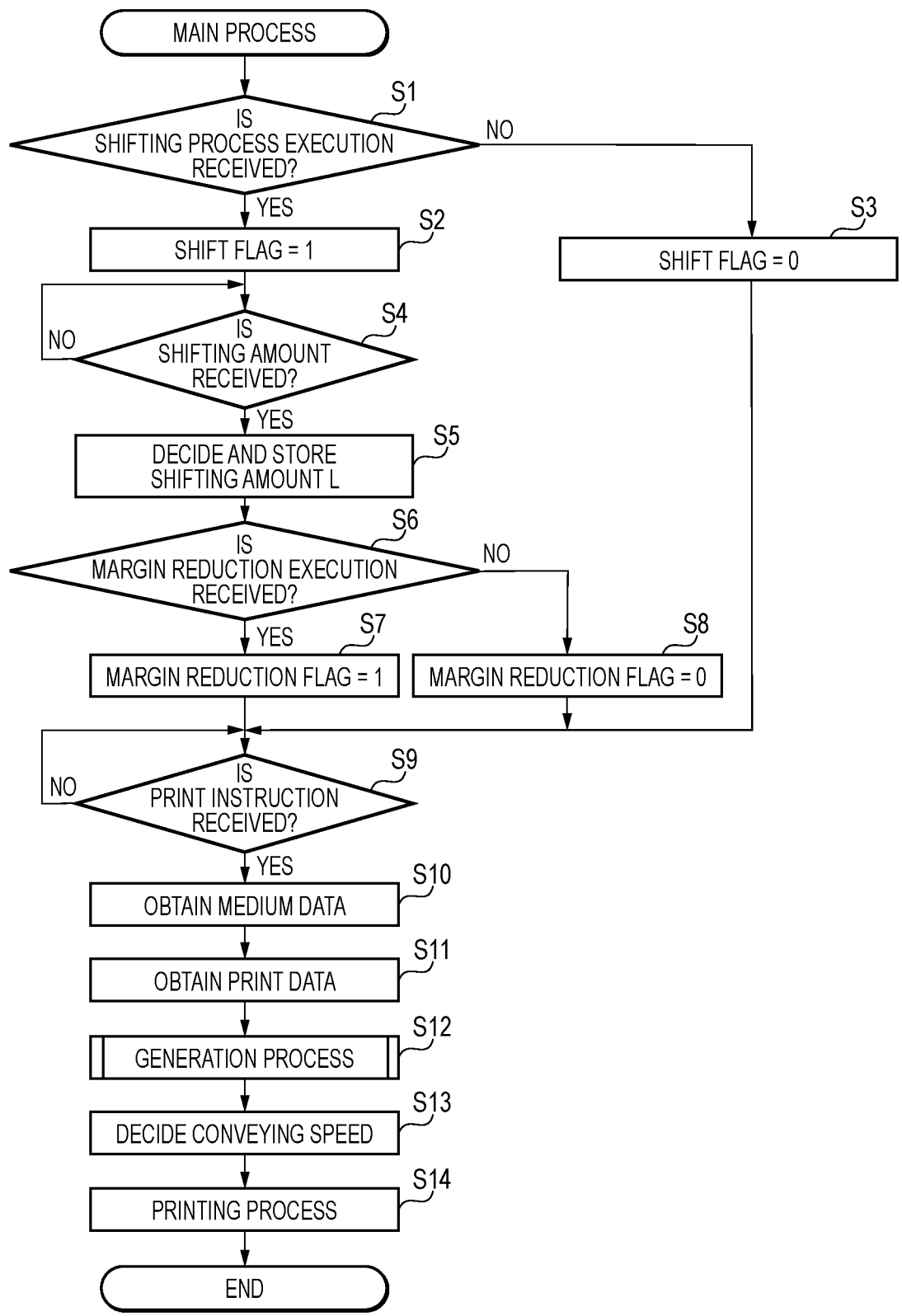
FIG. 12 is a flowchart of a main process.

As illustrated in FIG. 12, the CPU 7 determines whether or not the instruction to execute the shifting process is received (S1). The user inputs the instruction to execute the shifting process via the input device 3 when the shifting process is executed in the main process. When the instruction to execute the shifting process is received (S1: YES), the CPU 7 stores 1 as the value of the shifting flag (S2) and transitions the process to S4. When no instruction to execute the shifting process is received (S1: NO), the CPU 7 stores 0 as the value of the shift flag (S3) and transitions the process to S9.

The CPU 7 determines whether or not the input of the shifting amount L is received (S4). The user inputs the shifting amount L deciding the oblique angle θ of the input image by the shifting process via the input device 3. When the input of the shifting amount L is not received (S4: NO), the CPU 7 returns the process to the determination of S4 and repeats the determination of S4 until the input of the shifting amount L is received. When the input of the shifting amount L is received (S4: YES), the CPU 7 decides the shifting amount in the shifting process as the shifting amount L received in S4 and stores the shifting amount L in the storage device 9 (S5). The CPU 7 transitions the process to S6.

The CPU 7 determines whether or not the instruction to reduce the margin M is received (S6). When the user desires to reduce the margin M in order to print the entire print image elongated in the sub-scanning direction Y by the shifting process, the user inputs the instruction to reduce the margin M via the input device 3. When the instruction to reduce the margin M is received (S6: YES), the CPU 7 stores 1 as the value of the margin reduction flag (S7) and transitions the process to S9. When no instruction to reduce the margin M is received (S6: NO), the CPU 7 stores 0 as the value of the margin reduction flag (S8) and transitions the process to S9.

The CPU 7 determines whether or not the print instruction is received (S9). When printing the input image, the user inputs the print instruction via the input device 3. When the print instruction is not received (S9: NO), the CPU 7 returns the process to the determination of S9 and repeats the determination of S9 until the print instruction is received. When the print instruction is received (S9: YES), the CPU 7 transitions the process to S10.

The CPU 7 obtains medium data (S10). The medium data is data indicating the type of the print medium T (cut paper T1 or roll paper T2) and the length of the margin M. When the type of the print medium T is the roll paper T2, the medium data contains data on the length of the printable area in the main scanning direction X and the sub-scanning direction Y.

The CPU 7 obtains the image data indicating the input image (S11). The image data is data associated with the plurality of elements 61 arranged in the main scanning direction X. The image data for the type of the print medium T contains data on the position of the input image in the printable area. The CPU 7 obtains, for example, the image data and the medium data generated by the external device 99 from the external device 99 via the communication device 4. The CPU 7 may obtain the image data and the medium data stored in the storage device 9 or may obtain the image data and the medium data input by the input device 3 according to the user operation. The CPU 7 transitions the process to S12.

The CPU 7 executes a generation process (S12). The generation process is a process of generating the print data for printing the print image for each line by selectively heating the plurality of elements 61 based on the image data obtained in S11.

Figure 13:
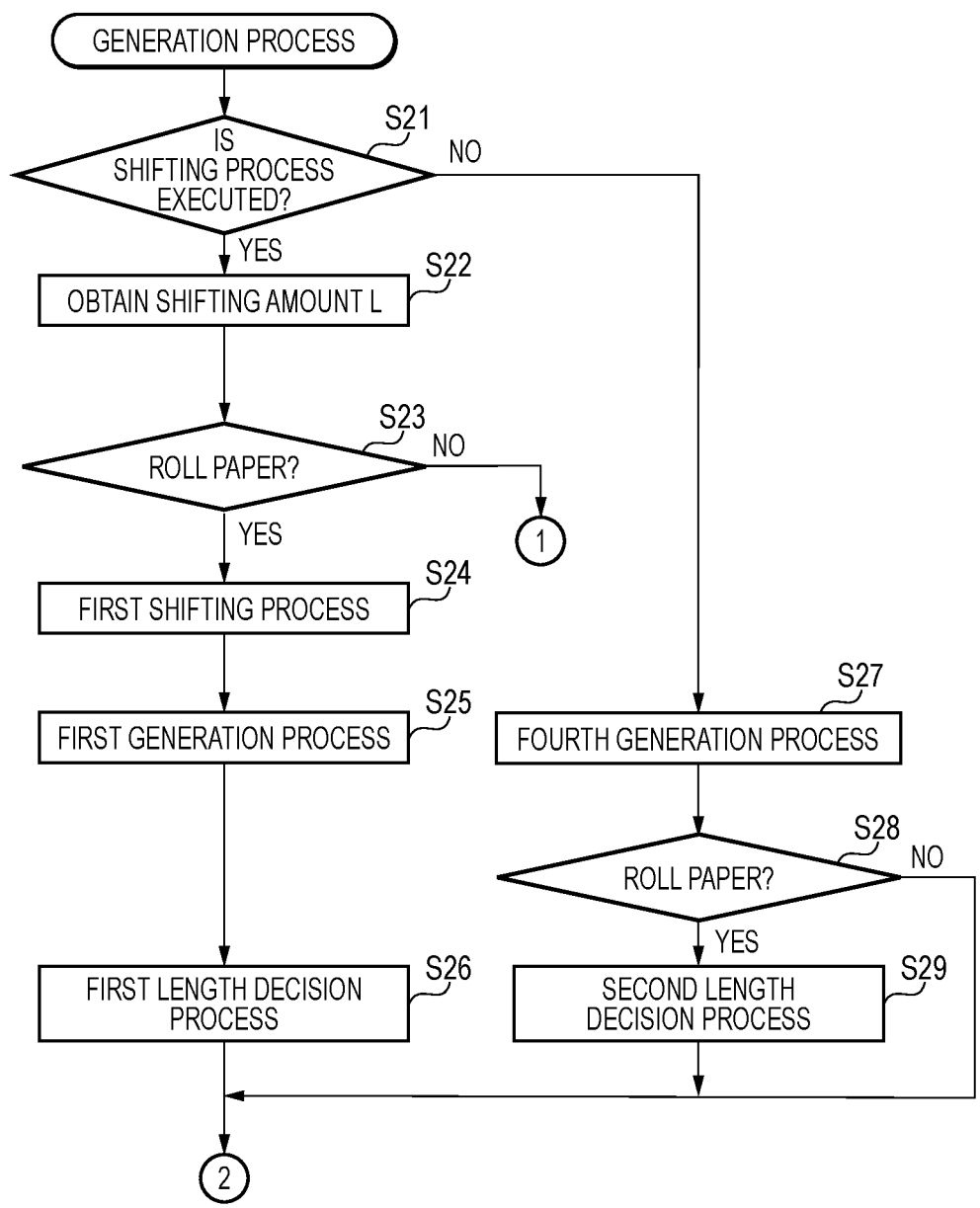
FIG. 13 is a flowchart of a generation process.

The generation process (S12, refer to FIG. 12) executed in the main process will be described with reference to FIGS. 13 to 15. As illustrated in FIG. 13, the CPU 7 determines based on the value of the shift flag whether or not to execute the shifting process (S21). When the value of the shift flag is 1 and the shifting process is to be executed (S21: YES), the CPU 7 obtains the shifting amount L stored in the storage device 9 in S5 (refer to FIG. 12) (S22) and transitions the process to S23. When the value of the shift flag is 0 and the shifting process is not to be executed (S21: NO), the CPU 7 transitions the process to S27.

The CPU 7 determines based on the medium data obtained in S10 (refer to FIG. 12) whether or not the type of the print medium T is the roll paper T2 (S23). When the type of the print medium T is the roll paper T2 (S23: YES), the CPU 7 transitions the process to S24. When the type of the print medium T is the cut paper T1 (S23: NO), the CPU 7 transitions the process to S31 (refer to FIG. 14).

Figure 14:
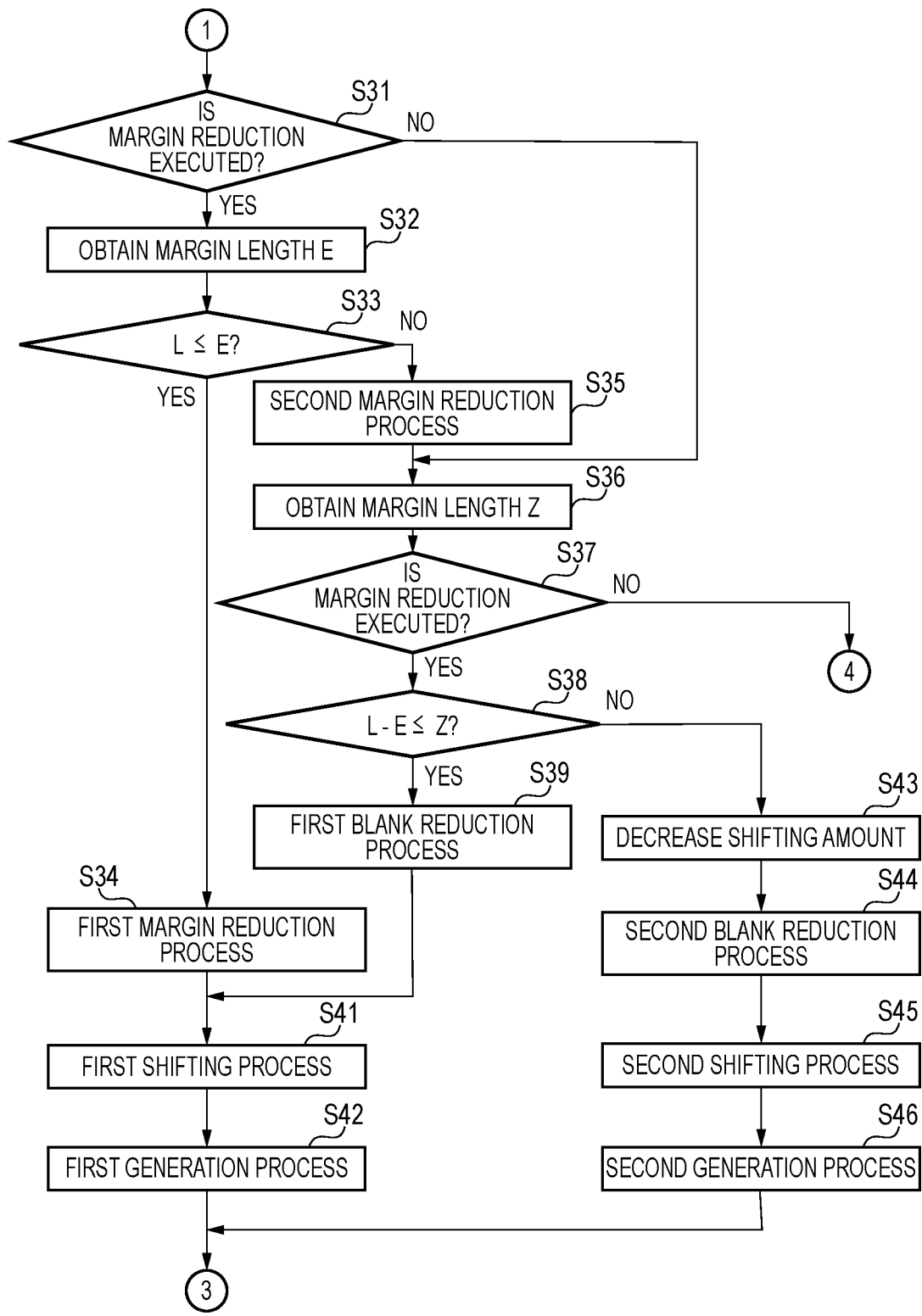
FIG. 14 is a flowchart of the generation process following FIG. 13.
Figure 15:
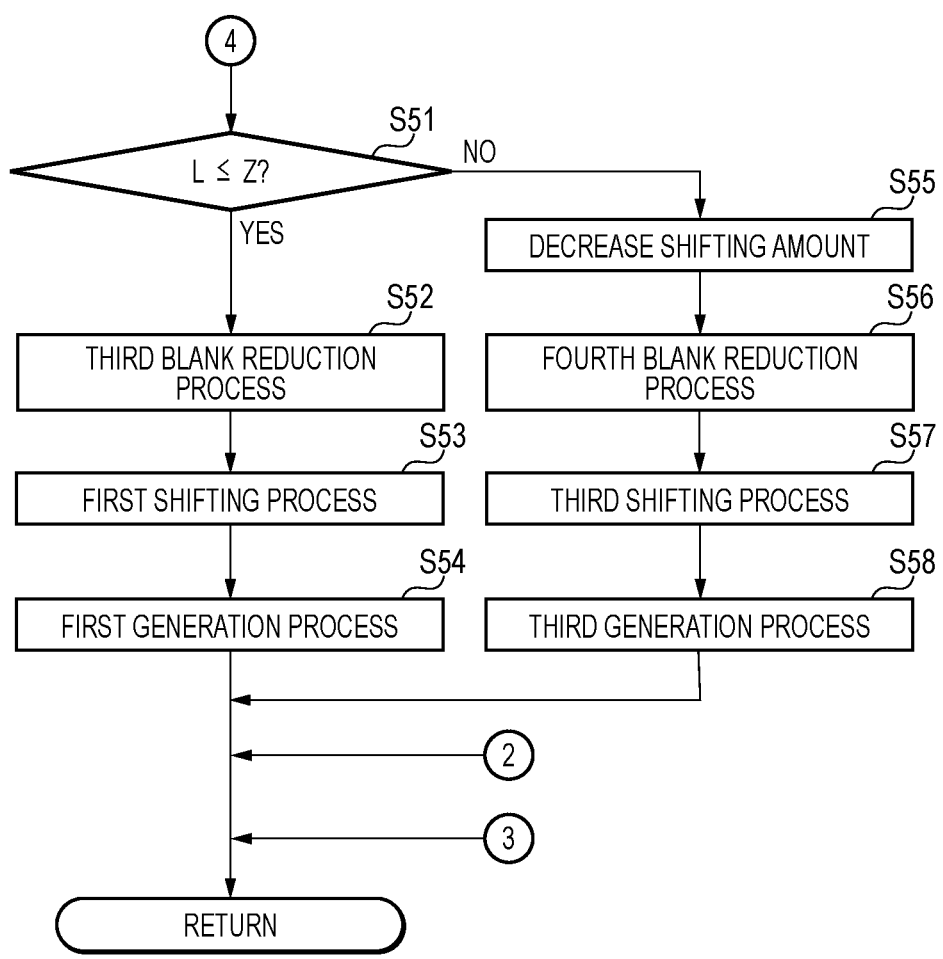
FIG. 15 is a flowchart of the generation process following FIG. 14.

As illustrated in FIG. 14, the CPU 7 determines based on the value of the margin reduction flag whether or not to reduce the margin M in order to print the entire print image elongated in the sub-scanning direction Y by the shifting process (S31). When the value of the margin reduction flag is 1 and the margin M is to be reduced (S31: YES), the CPU 7 obtains a margin length E in the sub-scanning direction Y based on the medium data (S32) and transitions the process to S33. The margin length E is a sum of the length of the margin M of the printable area on the downstream side Y1 in the sub-scanning direction and the length of the margin M of the printable area on the upstream side Y2 in the sub-scanning direction. When the value of the margin reduction flag is 0 and the margin M is not to be reduced (S31: NO), the CPU 7 transitions the process to S36.

The CPU 7 determines whether or not the shifting amount L obtained in S22 (refer to FIG. 13) is equal to or smaller than the margin length E obtained in S32 (S33). When the shifting amount L is equal to or smaller than the margin length E (S33: YES), the CPU 7 executes a first margin reduction process (S34). The first margin reduction process is a process of reducing the length of the margin M in the sub-scanning direction Y by the shifting amount L. After the first margin reduction process of S34 is executed, the length of the margin M in the sub-scanning direction Y becomes (E−L). The CPU 7 transitions the process to S41.

When the shifting amount L is larger than the margin length E (S33: NO), the CPU 7 executes a second margin reduction process (S34). The second margin reduction process is a process of reducing the length of the margin M in the sub-scanning direction Y by the margin length E. The CPU 7 transitions the process to S36.

The CPU 7 obtains a blank length Z in the sub-scanning direction Y based on the image data (S36). The blank length Z is a sum of the lengths of all blank areas R within the printable area in the sub-scanning direction Y. The CPU 7 transitions the process to S37.

The CPU 7 determines based on the value of the margin reduction flag whether or not the margin M is reduced (S37). When the value of the margin reduction flag is 1 and the margin M is reduced (S37: YES), the CPU 7 determines whether or not a shift difference (L−E) formed by subtracting the margin length E from the shifting amount L is equal to or smaller than the blank length Z obtained in S36 (S38).

When the shift difference is equal to or smaller than the blank length Z (S38: YES), the CPU 7 executes a first blank reduction process (S39). The first blank reduction process is a process of reducing the length of the blank area R in the sub-scanning direction Y by the shift difference (L−E) by deleting the blank lines of the blank area R. After the first blank reduction process of S39 is executed, a sum of the lengths of the blank areas R in the sub-scanning direction Y becomes Z−(L−E). The CPU 7 transitions the process to S41.

The CPU 7 executes a first shifting process (S41). The first shifting process is a process of shifting the dots composing the input image indicated by the image data in the sub-scanning direction Y based on the shifting amount L obtained in S22 to form the dots composing the print image. The CPU 7 executes a first generation process (S42). The first generation process is a process of generating the print data for printing the print image after executing the first shifting process. The CPU 7 returns the process to the main process (refer to FIG. 12).

When the shift difference is larger than the blank length Z (S38: NO), the CPU 7 determines based on the shifting amount L in the shifting process that the dots cannot be shifted, and thus, the CPU 7 decreases the shifting amount L obtained in S22 to form LA (S43). The shifting amount LA decreased in S43 satisfies the condition LA≤E+Z. The CPU 7 executes a second blank reduction process (S44). The second blank reduction process is a process of reducing the length of the blank area R in the sub-scanning direction Y by a shift difference (LA−E) by deleting the blank lines of the blank area R. After the second blank reduction process of S44 is executed, a sum of the lengths of the blank areas R in the sub-scanning direction Y becomes Z−(LA−E). The CPU 7 transitions the process to S45.

The CPU 7 executes a second shifting process (S45). The second shifting process is a process of shifting the dots composing the input image indicated by the image data in the sub-scanning direction Y based on the decreased shifting amount LA to form the dots composing the print image. The CPU 7 executes a second generation process (S46). The second generation process is a process of generating the print data for printing the print image after executing the second shifting process. The CPU 7 returns the process to the main process.

When the value of the margin reduction flag is 0 and the margin M is not to be reduced (S37: NO), as illustrated in FIG. 15, the CPU 7 determines whether or not the shifting amount L is equal to or smaller than the blank length Z (S51).

When the shifting amount L is equal to or smaller than the blank length Z (S51: YES), the CPU 7 executes a third blank reduction process (S52). The third blank reduction process is a process of reducing the length of the blank area R in the sub-scanning direction Y by the shifting amount L by deleting the blank lines in the blank area R. The CPU 7 executes the first shifting process (S53). The CPU 7 executes the first generation process (S54). The CPU 7 returns the process to the main process.

When the shift difference is larger than the blank length Z (S51: NO), the CPU 7 determines that the dots cannot be shifted based on the shifting amount L in the shifting process, and thus, the CPU 7 decreases the shifting amount L obtained in S22 to LB (S55). The shifting amount LB decreased in S55 satisfies the condition LB≤Z. The CPU 7 executes a fourth blank reduction process (S56). The fourth blank reduction process is a process of reducing the length of the blank area R in the sub-scanning direction Y by the shifting amount LB by deleting the blank lines in the blank area R. The CPU 7 transitions the process to S57.

The CPU 7 executes a third shifting process (S57). The third shifting process is a process of shifting the dots composing the input image indicated by the image data in the sub-scanning direction Y based on the decreased shifting amount LB to form the dots composing the print image. The CPU 7 executes a third generation process (S58). The third generation process is a process of generating the print data for printing the print image after executing the third shifting process. The CPU 7 returns the process to the main process.

As illustrated in FIG. 13, when the type of the print medium T is the roll paper T2 (S23: YES), the CPU 7 executes the first shifting process (S24). The CPU 7 executes the first generation process (S25).

The CPU 7 executes a first length decision process (S26). The first length decision process decides the length of the printed matter to be printed on the roll paper T2 based on the printable area, the margin length E, and the shifting amount L before executing the shifting process. The length of the printed matter decided by the first length decision process is larger by the shifting amount L than the length of the printed matter decided by a second length decision process described later. The CPU 7 returns the process to the main process.

When the value of the shift flag is 0 and the shifting process is not to be executed (S21: NO), the CPU 7 executes a fourth generation process (S27). The fourth generation process is a process of generating the print data for printing the input image as it is as the print image.

The CPU 7 determines whether or not the type of the print medium T is the roll paper T2 (S28). When the type of the print medium T is the roll paper T2 (S28: YES), the CPU 7 executes the second length decision process (S29) and returns the process to the main process. The second length decision process decides the length of the printed matter printed on the roll paper T2 based on the printable area and the margin length E. When the type of the print medium T is cut paper T1 (S28: NO), the CPU 7 returns the process to the main process.

As illustrated in FIG. 12, after executing the generation process (S12) in the main process, the CPU 7 decides a conveying speed of the print medium T by the conveyance device 5 (S13). The CPU 7 decides the conveying speed based on the shifting amount L in S13. The conveying speed increases as the shifting amount L increases. The CPU 7 executes a printing process (S14). The printing process is a process in which the CPU 7 performs the printing operation based on the print data generated in the generation process (S12) and the conveying speed decided in S13. The CPU 7 ends the main process.

The printing apparatus 1 of the above-described embodiment obtains the image data indicating the input image when performing the printing on the print medium T (S11). The printing apparatus 1 generates the print data for printing the print image based on the image data (S12). The printing apparatus 1 executes the shifting process in the generation process (S25, S41, S45, S53, and S57). When performing the shifting process, the printing apparatus 1 reduces the size of the area where the print image is not printed over the entire area in the main scanning direction X on the print medium T (cut paper T1) in the sub-scanning direction Y (S34, S35, S39, S44, S52, and S56). The printing apparatus 1 shifts the dots composing the input image in the sub-scanning direction Y by executing the shifting process to configure the dots composing the print image. Accordingly, the printing apparatus 1 can decrease the peak number of the plurality of elements 61 to be energized and can perform the printing at the higher printing speed than the case where the dots are not shifted. On the other hand, the print image is elongated in the sub-scanning direction Y due to the shifting process. The printing apparatus 1 can print the entire print image elongated in the sub-scanning direction Y by reducing the size of the area where the print image is not printed in the sub-scanning direction Y. Therefore, the printing apparatus 1 can print the entire print image while maintaining a high printing speed.

The printing apparatus 1 reduces the margin length E in the margin M as the first example of the area where the print image is not printed. The printing apparatus 1 enlarges the length of the printable area in the sub-scanning direction Y by reducing the margin length E of the margin M. Accordingly, the printing apparatus 1 can print the entire print image even when the shifting process is executed.

The printing apparatus 1 reduces the length of the margin M in the sub-scanning direction Y on the downstream side Y1 in the sub-scanning direction with respect to the printable area N2. The printing apparatus 1 enlarges the length of the printable area in the sub-scanning direction Y by reducing the length of the margin M in the sub-scanning direction Y on the downstream side Y1 in the sub-scanning direction. Accordingly, the printing apparatus 1 can print the entire print image even when the shifting process is executed.

The printing apparatus 1 reduces the length of the margin M in the sub-scanning direction Y on the upstream side Y2 in the sub-scanning direction with respect to the printable area N2. The printing apparatus 1 enlarges the length of the printable area in the sub-scanning direction Y by reducing the length of the margin M in the sub-scanning direction Y on the upstream side Y2 in the sub-scanning direction. Accordingly, the printing apparatus 1 can print the entire print image even when the shifting process is executed.

The printing apparatus 1 reduces the lengths of the margin M both on downstream side Y1 in the sub-scanning direction and on upstream side Y2 in the sub-scanning direction in the sub-scanning direction Y with respect to the printable area N2. The printing apparatus 1 enlarges the length of the printable area in the sub-scanning direction Y by reducing the length of the margin M in the sub-scanning direction Y on the downstream side Y1 in the sub-scanning direction and on the upstream side Y2 in the sub-scanning direction. Accordingly, the printing apparatus 1 can print the entire print image even when the shifting process is executed.

The printing apparatus 1 deletes the blank lines in the blank area R as the second example of the area where the print image is not printed to reduce the blank length Z in the blank area R. Accordingly, the printing apparatus 1 can print the entire print image inside the printable area even when the shifting process is executed.

When reducing the blank length Z in the blank area R, the printing apparatus 1 deletes the amount of the blank lines corresponding to the shifting amount L. The length of the print image in the sub-scanning direction Y increases based on the shifting amount L due to the shifting process. The printing apparatus 1 deletes the amount of the blank lines corresponding to the shifting amount L. Accordingly, the printing apparatus 1 can print the entire print image inside the printable area even when the shifting process is executed.

The printing apparatus 1 reduces at least one of the blank areas R on the downstream side Y1 in the sub-scanning direction and the upstream side Y2 in the sub-scanning direction with respect to the print image. The printing apparatus 1 deletes the blank lines in at least one of the blank areas R on the downstream side Y1 in the sub-scanning direction and the upstream side Y2 in the sub-scanning direction with respect to the print image. Accordingly, the printing apparatus 1 can print the entire print image inside the printable area even when the shifting process is executed.

The printing apparatus 1 reduces both the blank areas R on the downstream side Y1 in the sub-scanning direction and the upstream side Y2 in the sub-scanning direction with respect to the print image. The printing apparatus 1 deletes the blank lines on both the downstream side Y1 in the sub-scanning direction and the upstream side Y2 in the sub-scanning direction with respect to the print image. Accordingly, the printing apparatus 1 can print the entire print image inside the printable area even when the shifting process is executed.

When the printing apparatus 1 reduces both the blank areas R on the downstream side Y1 in the sub-scanning direction and on the upstream side Y2 in the sub-scanning direction with respect to the print image, the amounts of the blank lines to be deleted in the respective blank areas R are set to be the same. In this case, since the lengths of the respective blank areas R are equally reduced, the difference between the position of the print image on the print medium T actually printed and the position of the print image assumed by the user is shortened. Therefore, the printing apparatus 1 can print the print image desired by the user even when the shifting process is executed.

The printing apparatus 1 reduces the blank area R by deleting the blank lines in the blank area R between the two print images. Accordingly, the printing apparatus 1 can print the entire print image inside the printable area even when the shifting process is executed.

The printing apparatus 1 decides the shifting amount L in the shifting process and stores the shifting amount L in the storage device 9 (S5). In the shifting process, the printing apparatus 1 shifts the dots composing the input image based on the shifting amount L in the sub-scanning direction Y to form the dots composing the print image. Accordingly, the printing apparatus 1 can decrease the peak number of the plurality of elements 61 to be energized and can perform the printing at a higher printing speed than the case where the dots are not shifted.

The printing apparatus 1 compares the magnitude relationship between the decided shifting amount L and the blank length Z of the blank area R and determines whether or not the dots can be shifted based on the shifting amount L in the shifting process (S51). When the shifting amount L is larger than the blank length Z (S51: NO) and the dots cannot be shifted based on the shifting amount L in the shifting process, the printing apparatus 1 decreases the shifting amount L to LB. The printing apparatus 1 corrects the shifting amount L to be small when the dots are not shifted based on the decided shifting amount. Accordingly, the printing apparatus 1 can print the entire print image inside the printable area even when the shifting process is executed.

The printing apparatus 1 receives the shifting amount L via the input device 3 (S4). The printing apparatus 1 decides the shifting amount in the shifting process as the shifting amount L received in S4 (S5). In the printing apparatus 1, the user can input the shifting amount L via the input device 3. Accordingly, the printing apparatus 1 can print the print image with the shifting amount L desired by the user.

When the print medium T is the roll paper T2, the printing apparatus 1 executes the first length decision process (S26) or the second length decision process (S29). The printing apparatus 1 decides the length of the printed matter to be printed on the roll paper T2 by the first length decision process or the second length decision process. The printing apparatus 1 executes the first length decision process when executing the shifting process, and executes the second length decision process when not executing the shifting process. The printing apparatus 1 determines whether or not to execute the shifting process in the generation process (S21). The printing apparatus 1 sets the length of the printed matter decided by the first length decision process to be larger than the length of the printed matter decided by the second length decision process. Accordingly, the printing apparatus 1 can print the entire print image on the roll paper T2 even when executing the shifting process while maintaining a high printing speed.

The printing apparatus 1 sets the length of the printed matter decided by the first length decision process to be larger than the length of the printed matter decided by the second length decision process by the shifting amount L. Accordingly, the printing apparatus 1 can print the entire print image on the roll paper T2 even when the shifting process is executed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The printing apparatus 1 may be a printing apparatus having a line thermal head for thermally transferring an ink ribbon as the print head 6. The printing apparatus 1 may be an inkjet printer including a plurality of piezoelectric elements as the plurality of elements 61 and a line inkjet head as the print head 6. The printing apparatus 1 may be the electrophotographic printer that includes a plurality of LEDs (light emitting diodes) as the plurality of elements 61 and a line LED head as the print head 6.

The print medium T may be a lamination tape in which release paper is laminated on one side of the double-sided adhesive tape and a tape is laminated on the other side of the double-sided adhesive tape. The print medium T may be fanfold paper that is folded along perforations engraved on the paper to be cut into the paper.

Various changes may be added to the shifting process. The direction in which the print image is oblique with respect to the input image by shifting the dots by the shifting process is not limited to the above embodiment. For example, the print image may have a shape that is oblique toward the other side X2 in the main scanning direction and the downstream side Y1 in the sub-scanning direction in comparison with the input image. The print image may, for example, have a V-shaped oblique shape in comparison with the input image. In the shifting process, the dots composing the input image may be shifted not only in the sub-scanning direction Y but also in the main scanning direction X. The print image may, for example, have a clockwise rotated shape in comparison with the input image.

In the first to fourth specific examples, the printing is performed based on two input images, but the printing may be performed based on one input image or three or more input images. When there are two or more input images inside the printable area, the separate shifting amounts may be set for the respective input images. For example, in the first specific example illustrated in FIG. 3, the shifting amount L1 (refer to FIG. 5) is set for the input image U1, and the shifting amount L2 (refer to FIG. 9) is set for the input image U2. In the shifting process, the printing apparatus 1 shifts the dots composing the input image U1 in the sub-scanning direction Y based on the shifting amount L1. The printing apparatus 1 shifts the dots composing the input image U2 in the sub-scanning direction Y based on the shifting amount L2.

The printing apparatus 1 may change the print data generated by the generation process so that some dots in the printed portion are not formed. Accordingly, the printing apparatus 1 can decrease the peak number of the plurality of elements 61 to be energized.

In the above-described embodiment, the printing apparatus 1 reduces the margin M or the blank area R in the sub-scanning direction Y as the area where the print image is not printed over the entire area in the main scanning direction X on the print medium T (cut paper T1). On the other hand, the printing apparatus 1 may reduce any one of the margin M and the blank area R in the sub-scanning direction Y.

Out of the margin M and the blank area R, when the margin M is reduced in the sub-scanning direction Y, the printing apparatus 1 may determine based on the shifting amount L in the shifting process whether or not the dots can be shifted. In this case, the printing apparatus 1 compares the decided shifting amount L and the margin length E of the margin M to obtain a magnitude relationship therebetween. When the shifting amount L is larger than the margin length E, the printing apparatus 1 determines based on the shifting amount L in the shifting process that the dots cannot be shifted. The printing apparatus 1 decreases the shifting amount L to LC. The printing apparatus 1 corrects the shifting amount L to be small when the dots are not shifted based on the decided shifting amount. The printing apparatus 1 can print the entire print image inside the printable area even when the shifting process is executed. In this case, the process of determining whether or not the dots can be shifted based on the shifting amount L in the shifting process when reducing the margin M in the sub-scanning direction Y is an example of a first determination process of the present disclosure. The process of correcting the shifting amount L to be small when the dot is not shifted based on the decided shifting amount is an example of a first correction process of the present disclosure.

The main process may be executed by a dedicated or general-purpose device provided separately from the printing apparatus 1. The printing apparatus 1 may change a configuration of the conveyance device 5 according to a type of the print head 6. The conveyance device 5 may change the relative position between the print head 6 and the print target by moving the print head 6. The communication device 4 may be configured to communicate with the external device 99 wirelessly or by wire.

The program containing commands for executing the main process may be stored in a storage device of the printing apparatus 1 by the time the CPU 7 executes the corresponding program. Therefore, each of the program obtaining methods, the obtaining paths, and the devices storing the program may be changed as appropriate. The program executed by each printing apparatus 1 may be received from other devices via cable or wireless communication to be stored in the storage device such as a storage device. Other devices include, for example, PCs and servers connected via a network.

Each step of the main process is not limited to the example of being executed by the CPU 7, and may be partially or fully executed by another electronic device (for example, ASIC). Each step of the main process may be distributed and processed by a plurality of electronic devices (for example, a plurality of CPUs). Each step of the main process can be changed in order, omitted, or added as required. The following changes may be added to the main process as appropriate.

The CPU 7 does not have to receive the shifting amount L itself in S4. The CPU 7 may receive the oblique angle θ instead of the shifting amount L. The processes of S4 and S5 may be omitted. A process of deciding the shifting amount L according to an input screen may be added to the main process.

When reducing the margin M in the sub-scanning direction Y, the CPU 7 may compare the shifting amount L with a predetermined value instead of the margin length E in the determination of S33. In some cases, the printing apparatus 1 may not be able to eliminate the margin M in the sub-scanning direction Y according to the configuration of the device. The CPU 7 compares the shifting amount L with a maximum reducible value EM by which the margin M can be reduced as a predetermined value. When the shifting amount L is larger than the maximum reducible value EM, the CPU 7 executes a process of reducing the margin length E of the margin M by the maximum reducible value EM instead of the second margin reduction process in S35. After this process, the length of the margin M in the sub-scanning direction Y becomes (E−EM). The above-described modified examples may be combined as appropriate within the consistent range.

In the above-described embodiment, the CPU 7 is an example of the control device of the present disclosure. The process of S11 is an example of an obtaining process of the present disclosure. The processes of S24, S41, S45, S53, and S57 are examples of the shifting process of the present disclosure. The blank area M and the blank area R are examples of a plain area of the present disclosure. The processes of S34, S35, S39, S44, S52, and S56 are examples of the reduction process of the present disclosure. The process of S5 is an example of a shifting amount decision process of the present disclosure. The process of S51 is an example of a second determination process of the present disclosure. The process of S55 is an example of a second correction process of the present disclosure. The process of S4 is an example of a shifting amount reception process of the present disclosure. The Roll paper T2 is an example of a continuous medium of the present disclosure. The process of S21 is an example of a selection process of the present disclosure. The processes of S26 and S29 are examples of a width decision process of the present disclosure.

What is claimed is:

1. A printing apparatus comprising:
   a print head having a plurality of elements arranged in a main scanning direction;
   a conveyance device configured to relatively move a print medium and the print head in a sub-scanning direction, the sub-scanning direction intersecting the main scanning direction; and
   a control device configured to perform control of printing a print image by controlling the print head to drive the plurality of elements to form dots on each line on the print medium while controlling the conveyance device to relatively move the print medium and the print head in the sub-scanning direction, the control device being configured to:
   obtain image data indicating an input image, the input image having a length and the print image having a length;
   generate print data for printing the print image for each line based on the image data, the generating of the print data comprising:
      shifting the dots composing the input image in the sub-scanning direction to form the dots composing the print image,
         in the shifting the dots, the dots are shifted in the sub-scanning direction so that the length of the print image in the sub-scanning direction becomes longer than the length of the input image, the length of the print image being extended by a length extended amount; and
      reduce a width of a plain area in the sub-scanning direction of the print medium, the plain area being an area where the print image is not printed over the entire area of the plain area in the main scanning direction on the print medium, in the reducing the width, the width of the plain area in the sub-scanning direction is reduced an amount that is determined based on the length extended amount of the shifting the dots; and wherein the plain area is a margin formed outside a printable area, the printable area being an area where the print image can be printed on the print medium.

2. The printing apparatus according to claim 1, wherein in the reducing, the control device is configured to reduce a width of the margin in the sub-scanning direction on a downstream side in the sub-scanning direction with respect to the printable area.

3. The printing apparatus according to claim 1, wherein in the reducing, the control device is configured to reduce a width of the margin in the sub-scanning direction on an upstream side in the sub-scanning direction with respect to the printable area.

4. The printing apparatus according to claim 1, wherein in the reducing, the control device is configured to reduce the width of the margin in the sub-scanning direction on the downstream side and an upstream side in the sub-scanning direction with respect to the printable area.

5. The printing apparatus according to claim 1, wherein the plain area is inside a printable area and is a blank area where the print image is not printed over the entire area in the main scanning direction, the printable area being an area where the print image can be printed on the print medium, and wherein in the reducing, the control device is configured to delete a blank line composing the blank area of lines in the print data.

6. The printing apparatus according to claim 5, wherein in the reducing, the control device is configured to delete the blank line by an amount corresponding to a shifting amount for shifting the dots in the sub-scanning direction in the shifting.

7. The printing apparatus according to claim 5, wherein in the reducing, the control device is configured to delete the blank line on a downstream side in the sub-scanning direction with respect to the print image or the blank line on an upstream side in the sub-scanning direction with respect to the print image in the reduction process.

8. The printing apparatus according to claim 7, wherein in the reducing, the control device is configured to delete the blank line on the downstream side in the sub-scanning direction with respect to the print image and the blank line on the upstream side in the sub-scanning direction with respect to the print image in the reduction process.

9. The printing apparatus according to claim 8, wherein in the reducing, the control device is configured to set an amount of the blank line to be deleted on the downstream side in the sub-scanning direction with respect to the print image the same as an amount of blank line to be deleted on the upstream side in the sub-scanning direction with respect to the print image.

10. The printing apparatus according to claim 5, wherein in the reducing, in a case the plurality of print images are printed in the printable area, the control device is configured to delete the blank line between the plurality of print images in the sub-scanning direction.

11. The printing apparatus according to claim 1, wherein:

in the reducing the width, the amount that the width of the plain area in the sub-scanning direction is reduced is the same as the length extended amount of the shifting the dots.

12. A printing apparatus comprising:

a print head having a plurality of elements arranged in a main scanning direction;

a conveyance device configured to relatively move a continuous medium and the print head in a sub-scanning direction, the sub-scanning direction being intersecting the main scanning direction, the continuous medium being elongated in the sub-scanning direction; and a control device configured to perform control of creating a printed matter, the creating of the printed matter comprising forming dots for each line on the continuous medium by controlling the print head to drive the plurality of elements while controlling the conveyance device to relatively move the continuous medium and the print head in the sub-scanning direction, thereby printing a print image, the control device being configured to:

obtain image data indicating an input image;

generate print data for printing the print image for each line based on the image data, the generating of the print data comprising:

shifting the dots composing the input image in the sub-scanning direction to form the dots composing the print image;

select whether to perform the shifting of the dots in the generating of the print data; and decide a width of the printed matter in the sub-scanning direction based on the generated print data, wherein in the deciding, the control device is configured to set a first width to be larger than a second width, the first width corresponding to the width of the print material in the sub-scanning direction in a case the performing of the shifting is selected to be performed, the second width corresponding to the width of the print material in the sub-scanning direction in a case the performing of the shifting process is selected to not to be performed.

13. The printing apparatus according to claim 12, wherein in the deciding, the control device is configured to set the first width to be larger than the second width by an amount corresponding to a shifting amount for shifting the dots in the sub-scanning direction in the shifting.

14. A printing apparatus comprising:

a print head having a plurality of elements arranged in a main scanning direction;

a conveyance device configured to relatively move a print medium and the print head in a sub-scanning direction, the sub-scanning direction intersecting the main scanning direction; and a control device configured to perform control of printing a print image by controlling the print head to drive the plurality of elements to form dots on each line on the print medium while controlling the conveyance device to relatively move the print medium and the print head in the sub-scanning direction, the control device being configured to:

obtain image data indicating an input image;

generate print data for printing the print image for each line based on the image data, the generating of the print data comprising:

shifting the dots composing the input image in the sub-scanning direction to form the dots composing the print image; and reduce a width of a plain area in the sub-scanning direction of the print medium, the plain area being an area where the print image is not printed over the entire area of the plain area in the main scanning direction on the print medium;

wherein the plain area is inside a printable area and is a blank area where the print image is not printed over the entire area in the main scanning direction, the printable area being an area where the print image can be printed on the print medium, and wherein in the reducing, the control device is configured to delete a blank line composing the blank area of lines in the print data;

wherein in the reducing, the control device is configured to delete the blank line on the downstream side in the sub-scanning direction with respect to the print image and the blank line on the upstream side in the sub-scanning direction with respect to the print image in the reduction process; and wherein in the reducing, the control device is configured to set an amount of the blank line to be deleted on the downstream side in the sub-scanning direction with respect to the print image the same as an amount of blank line to be deleted on the upstream side in the sub-scanning direction with respect to the print image.

15. A printing apparatus comprising:
a print head having a plurality of elements arranged in a main scanning direction;
a conveyance device configured to relatively move a print medium and the print head in a sub-scanning direction, the sub-scanning direction intersecting the main scanning direction; and
a control device configured to perform control of printing a print image by controlling the print head to drive the plurality of elements to form dots on each line on the print medium while controlling the conveyance device to relatively move the print medium and the print head in the sub-scanning direction, the control device being configured to:
obtain image data indicating an input image;
decide a shifting amount for shifting the dots composing the input image in the sub-scanning direction; and
generate print data for printing the print image for each line based on the image data, the generating of the print data comprising:
shifting the dots composing the input image in the sub-scanning direction by the decided shifting amount to form the dots composing the print image;
wherein the control device is further configured to:
after the deciding, perform a first determining comprising determining whether the dots composing the input image can be shifted in the sub-scanning direction in accordance with the determined shifting amount, the first determining being based on the shifting amount and a width of a margin in the sub-scanning direction formed outside a printable area, the printable area being an area where the print image can be printed on the print medium; and
in a case it is determined in the first determining that the dots composing the input image cannot be shifted in the sub-scanning direction in accordance with the decided shifting amount, correct the shifting amount to be smaller than the decided shifting amount.

16. The printing apparatus according to claim 15, further comprising:
an input device,
wherein the control device is further configured to:
receive setting of the shifting amount via the input device, and
wherein in the deciding, the control device is configured to decide the shifting amount based on the received setting.

17. A printing apparatus comprising:
a print head having a plurality of elements arranged in a main scanning direction;
a conveyance device configured to relatively move a print medium and the print head in a sub-scanning direction, the sub-scanning direction intersecting the main scanning direction; and
a control device configured to perform control of printing a print image by controlling the print head to drive the plurality of elements to form dots on each line on the print medium while controlling the conveyance device to relatively move the print medium and the print head in the sub-scanning direction, the control device being configured to:
obtain image data indicating an input image;
decide a shifting amount for shifting the dots composing the input image in the sub-scanning direction; and
generate print data for printing the print image for each line based on the image data, the generating of the print data comprising:
shifting the dots composing the input image in the sub-scanning direction by the decided shifting amount to form the dots composing the print image;
wherein the control device is further configured to:
after the deciding, perform a second determining comprising determining whether the dots composing the input image can be shifted in the sub-scanning direction in accordance with the decided shifting amount, the second determining being based on the shifting amount and a width of a blank area in the sub-scanning direction, the blank area being an area where the print image is not printed over the entire area in the main scanning direction inside a printable area, the printable area being an area where the print image can be printed on the print medium; and
in a case it is determined in the second determining that the dots composing the input image cannot to be shifted in the sub-scanning direction based on the shifting amount, correct the shifting amount to be smaller than the decided shifting amount.

18. The printing apparatus according to claim 17, further comprising:
an input device,
wherein the control device is further configured to:
receive setting of the shifting amount via the input device, and
wherein in the deciding, the control device is configured to decide the shifting amount based on the received setting.

* * * * *